United States Patent [19]

Ikeda et al.

[11] Patent Number: 5,717,500
[45] Date of Patent: Feb. 10, 1998

[54] IMAGE INPUT DEVICE AND METHOD

[75] Inventors: Osamu Ikeda, Kanagawa-ken; Katsuhiro Sato, Tochigi-ken, both of Japan

[73] Assignee: Nikon Corporation, Tokyo, Japan

[21] Appl. No.: 559,112

[22] Filed: Nov. 16, 1995

[30] Foreign Application Priority Data

| Nov. 17, 1994 | [JP] | Japan | 6-283029 |
| Nov. 22, 1994 | [JP] | Japan | 6-287014 |
| Nov. 22, 1994 | [JP] | Japan | 6-287015 |
| Nov. 22, 1994 | [JP] | Japan | 6-287016 |
| Dec. 13, 1994 | [JP] | Japan | 6-308561 |

[51] Int. Cl.⁶ ............... H04N 1/04; H04N 1/393
[52] U.S. Cl. ............. 358/449; 358/451; 358/474; 358/487
[58] Field of Search .................. 358/449, 451, 358/471, 474, 482, 494, 496, 497, 487; 382/298

[56] References Cited

U.S. PATENT DOCUMENTS

| 4,571,636 | 2/1986 | Itoh ............................ 358/482 |
| 5,140,443 | 8/1992 | Iwahara et al. .................. 358/474 |

FOREIGN PATENT DOCUMENTS

| 0533109A3 | 3/1993 | European Pat. Off. |
| 0583874A1 | 2/1994 | European Pat. Off. |

*Primary Examiner*—Scott A. Rogers
*Attorney, Agent, or Firm*—Oliff & Berridge, P.L.C.

[57] ABSTRACT

An image input device is capable of reading original mediums of different sizes. The input device includes an original holder, an illumination assembly, and an image composing assembly with first and second imaging assemblies having different magnifications. An image reading assembly having at least one sensor reads an image formed by the image composing assembly. An optical path switching assembly switches between a first optical path, which directs the reflecting light to the first imaging assembly, and a second optical path, which directs the reflecting light through the original to the second imaging assembly. A focusing assembly detects the focus condition of the image composed by the image composing assembly and performs a focusing operation. A driving assembly drives both the focusing assembly and the optical path switching assembly.

46 Claims, 20 Drawing Sheets

5,717,500

1

IMAGE INPUT DEVICE AND METHOD

BACKGROUND OF THE INVENTION

1. Field of the Invention

The present invention relates to an image input device that reads, for example, transparent original mediums such as slide film and non-transparent original mediums obtained by exposing the slide film and the like. The image input device is capable of reading a multiplicity of originals or original mediums of different sizes with improved focusing reliability.

2. Description of Related Art

FIGS. 18 and 19 depict a conventional image input device 200 for 35 mm slide film. The device 200 includes a slide holder 211 located in a central section to hold slide film 210.

A light source 220 is located to the right of the slide holder 211 to illuminate the slide film 210 that is held by the slide holder 211, as shown in FIG. 18. A concave mirror 220a directs light from the light source 220 to the slide film 210 through a group of filters 221 and a group of lenses 222. A reflection mirror 223 is located to the left of the slide holder 211, as shown in FIG. 18. The light that passes through the slide film 210 is perpendicularly refracted by the reflection mirror 223 and composed on a linear image sensor CCD 225. The image of the slide film 210 is read by the CCD 225, and photoelectrically converted image signals are output to a image processing unit, not shown, such as an external computer.

The slide holder 211 is slidably supported by two guide rails 213 through a stage 212, as shown in FIG. 18. The slide holder 211 is moved along a sub-scan direction by a film scanning mechanism 230 having a stage motor 231 and a leading screw 232 for scanning the slide holder 211. The leading screw 232 is rotated by the motor 231. The leading screw 232 is screwed into a screw barrel 214 in the stage 212. The slide holder 211 moves along the sub-scan direction as a result of the stage 212 sliding along the guide rails 213 by the rotation of the stage motor 231.

The imaging lens 224 and the CCD 225 are held at a set spacing interval by an optical system support member 226. The optical system support member 226 moves along the direction of the optical axis, as shown in FIG. 18, by focusing mechanism 240. The focusing mechanism 240 includes a focus adjustment motor 241 and a leading screw 242 for focus adjustment. The leading screw 242 is rotated by the motor 241. The leading screw 242 for focus adjustment is screwed into a screw barrel 227 on the optical system support member 226. The optical system support member 226 moves parallel to the optical axis and changes the distance between the imaging lens 224 and the slide film 210 held by the slide holder 211 by the rotation of the focus adjustment motor 241.

The image processing unit of a computer connected to the image input device 200 automatically processes the input of an image and performs focusing operations by computing the contrast of the image based on the input image signals and driving the focusing mechanism 240.

As seen in FIG. 19, the image input device 200 includes a case 250 with a concave part 251 formed in a central location with space for movement of the slide holder 211. Air intake openings or vent 252 are located on a side surface of the case 250. An exhaust fan 253 is located inside the case 250 to exhaust heat generated by the light source 220 and a power source 254, as shown in FIG. 18.

In this conventional example, the magnification of the imaging lens 224 is fixed for 35 mm size slide film. Hence, this conventional image input device 200 cannot be used when the size of the film original is changed. For example, use of an original 4"×5" in size results in only a partial reading of the original. Conversely, when the magnification of the imaging lens 224 is fixed to suit an original 4"×5" in size, a sufficient picture quality is not obtained when the lens is used for a 35 mm size original because only a portion of all the pixels in the CCD 225 is used.

A multiple number of image input devices are needed for different sized originals. To address this problem, the magnification of the imaging lens can be made variable. However, then the distance between the imaging lens 224 and the CCD 224 must also be changed.

When the magnification of the imaging lens 224 is variable, the size and complexity of mechanism increases because focusing adjustment and magnification adjustment must be executed separately.

Furthermore, the optical system support member 226 in the conventional image input device 200 may shift during shipping. Typically, such an optical system support member 226 shifts through excessive external force from impacts and shaking that normally occur during shipping. This shifting produces play between the focus adjustment lead screw 242 and the screw barrel 227 that decreases focussing precision. In addition to this, the concern also arises that an excessive load will be placed on the focus adjustment motor 241 if the components are moved when the drive is engaged.

SUMMARY OF THE INVENTION

An object of the present invention is to overcome the above problems by providing an image input device capable of reading originals or original mediums of differing sizes. This and other objects of the invention are achieved by providing an image input device that is capable of reading originals of differing sizes. The image input device includes an original holder that holds the original or original medium within the image input device. An illumination assembly, such as, for example, a light source, illuminates an image on the original or original medium. The light from the illumination assembly is reflected from/transilluminated through the original into an original reading assembly.

The original reading assembly includes an image composing assembly and an image reading assembly. The image input device preferably includes an optical system holder that holds the original reading assembly. The image composing assembly and the image reading assembly are positioned with the optical system holder.

The image composing assembly composes an image from the light reflected from/transilluminated through the original. The image composing assembly preferably includes first and second imaging assemblies. The light is selectively composed into an image using one of the first imaging assembly and the second imaging assembly. The first or second imaging assemblies are used based on the size of the original.

The first and second imaging assemblies preferably have different fixed magnifications. The range of the focal depth of one of the first and second imaging assemblies includes the range of focal depth of the other of the first and second imaging assemblies. A focusing operation is performed by changing each of the distances from the original to the first and second imaging assemblies without changing the magnification of the imaging assemblies.

The image reading assembly reads the images composed by the first and second imaging assemblies of the image composing assembly. The image reading assembly preferably includes at least one sensor, such as, for example, a CCD. The at least one sensor reads the images composed by the first and second imaging assemblies line by line as the original is scanned.

The image input device includes an optical path switching assembly to switch between the first and second imaging assemblies based on the size of the original to be read. The optical path switching assembly is placed within an optical path between the original and the first and second imaging assemblies. The optical path switching assembly switches the optical path of light reflected from/transilluminated through the original into the original reading assembly between a first optical path that guides the reflecting light from/transilluminating through the original to the first imaging assembly, and a second optical path that guides the reflecting light from/transilluminating through the original to the second imaging assembly.

According to one aspect of the invention, the optical path switching assembly preferably includes at least one reflective mirror. A first reflective mirror reflects light towards the first imaging assembly. A second reflective mirror can be movably positioned within the optical path extending between the first reflective mirror and the original holder. When the second reflective mirror is positioned within the optical path between the first reflective mirror and the original holder, the light from the original is reflected toward the second imaging assembly.

According to another aspect of the invention, the at least one reflective mirror preferably includes a reflective mirror having a first reflective surface that reflects light towards the first imaging assembly, and a second reflective surface that reflects light toward the second imaging assembly. The reflective mirror is movable such that the first and second reflective surfaces are alternatively positioned within the optical path of the light reflected from/transilluminated through the original.

According to another aspect of the invention, the at least one reflective mirror preferably includes a single movable reflective mirror positioned at an angle with respect to the optical path of light reflected from/transilluminated through the original. The single reflective mirror is movable to change the angle of the mirror with respect to the optical path of the reflecting light to direct the light through one of the first and second imaging assemblies. The first and second imaging assemblies are positioned at different angles with respect to the optical path of the light reflected from/transilluminating through the original.

According to another aspect of the invention, the at least one reflective mirror preferably includes a half mirror.

The image input device includes a focusing assembly that performs a focusing operation on the image composed by the image composing assembly and read by the image reading assembly. The focusing assembly detects the focus condition of the image composing assembly. The focusing assembly executes a focusing operation by changing at least one of the relative positions of the image composing assembly and the image reading assembly with respect to the original.

According to one aspect of the invention, the focusing assembly preferably performs a focusing operation by changing each of the distances between the original and the first and second imaging assemblies. The distances between the first and second imaging assemblies and the image composing assembly are fixed.

According to another aspect of the invention, the focusing assembly preferably performs the focusing operation by moving one of the original holder and the optical system holder.

The image input device further includes a driving assembly for driving both of the focusing assembly and the optical path switching assembly. As a result, the image input device according to the present invention has a reduced size. A transfer assembly transfers the driving force of the driving assembly to the focusing assembly. A connection assembly transfers the driving force of the driving assembly from the transfer assembly to the optical path switching assembly.

According to one aspect of the invention, the focusing assembly preferably includes a moving stage. The transfer assembly is connected to the moving stage to transfer the driving force of the driving assembly to the focusing assembly. The moving stage preferably includes a force-applying assembly that applies a force to move said moving stage towards said transfer assembly.

The moving stage preferably includes first and second opposing surfaces. The first imaging assembly and a first sensor are supported on the first surface. The second imaging assembly and a second sensor are supported on the second surface.

According to one aspect of the invention, the transfer assembly permits movement of the focusing assembly in at least three differing movement ranges. The focusing operation is performed during a focusing movement range. In the focusing movement range, the driving force of the driving assembly is transferred to the focusing assembly by the transfer assembly so that the focusing operation can be performed.

A switching operation is performed by the optical path switching assembly during an optical path switching movement range. A connecting assembly transfers the driving force of the focusing assembly to the optical path switching assembly during the optical path switching range.

The transfer of the driving force of the driving assembly to the focusing assembly is interrupted during a shipping movement range. In the shipping movement range, it is possible to block the transfer of the driving force to the focusing assembly. This prevents any excessive external force from being applied to the focusing assembly from an impact or shaking during shipping of the image input device. As a result, it is possible to maintain the necessary precision of the focusing assembly to conduct the focusing operation during the focusing movement range.

The image input device preferably includes a stop assembly that prevents movement of the focusing assembly in the shipping movement range.

In accordance with another aspect of the present invention, there is provided a method of reading image information from an original. The method includes a step of loading the original on an original holder in an image input device. An image on the original is then illuminated. Light from the original is then reflected and selectively composed into an image. The image is selectively composed using one of the first and second imaging assemblies. The image composed by one of the first and second imaging assembly is then read by an image reading assembly.

The light reflected from/transilluminated through the original is switched between a first optical path that guides the reflecting light from the original to the first imaging assembly, and a second optical path that guides the reflecting light from the original to the second imaging assembly based on the size of the original.

According to one aspect of the invention, the step of switching preferably includes positioning a reflective mirror in the optical path of the light reflecting from/transilluminating through the original to deflect the optical path to one of the first and second imaging assemblies.

The image composed by one of the first and second imaging assemblies is then focused. According to one aspect of the invention, the first and second imaging assemblies may be simultaneously focused. According to another aspect of the invention, focusing is executed by changing at least one of the relative positions of the first and second imaging assemblies and the image reading assembly with respect to the original.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
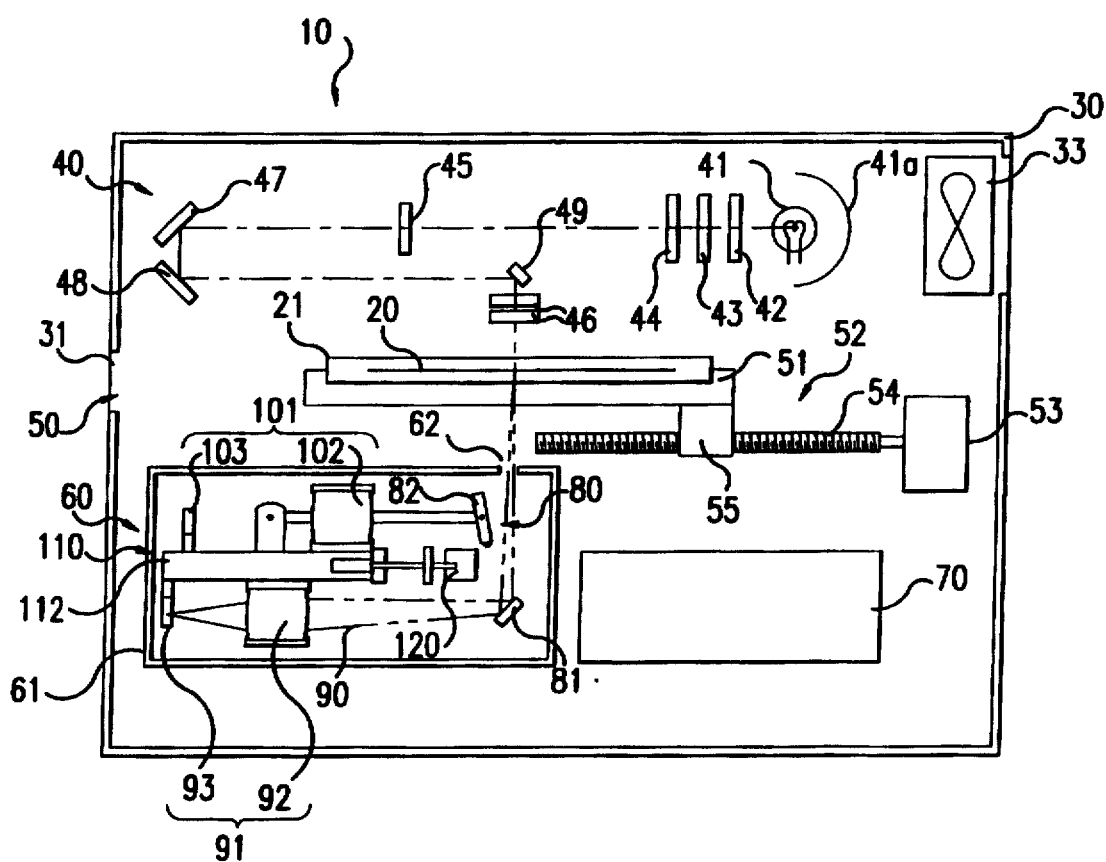
FIG. 1 is a side schematic view of an image input device.

As shown in FIG. 1, an image input device 10 reads an image from an original 20 and outputs image signals to an image processing unit, not shown, of an external device, such as a computer. The image input device 10 is capable of reading different sized originals 20 such as, for example, 35 mm and 4"×5" originals. Additionally, originals 20 having other sizes such as, for example, 6 cm×6 cm, 6 cm×7 cm, and 6 cm×9 cm can also be used.

The originals or original mediums 20 can be non-transparent originals such as, for example, exposed prints, posters, books, and magazines. The originals 20 may also be transparent originals such as, for example, film originals and film negatives.

Figure 2:
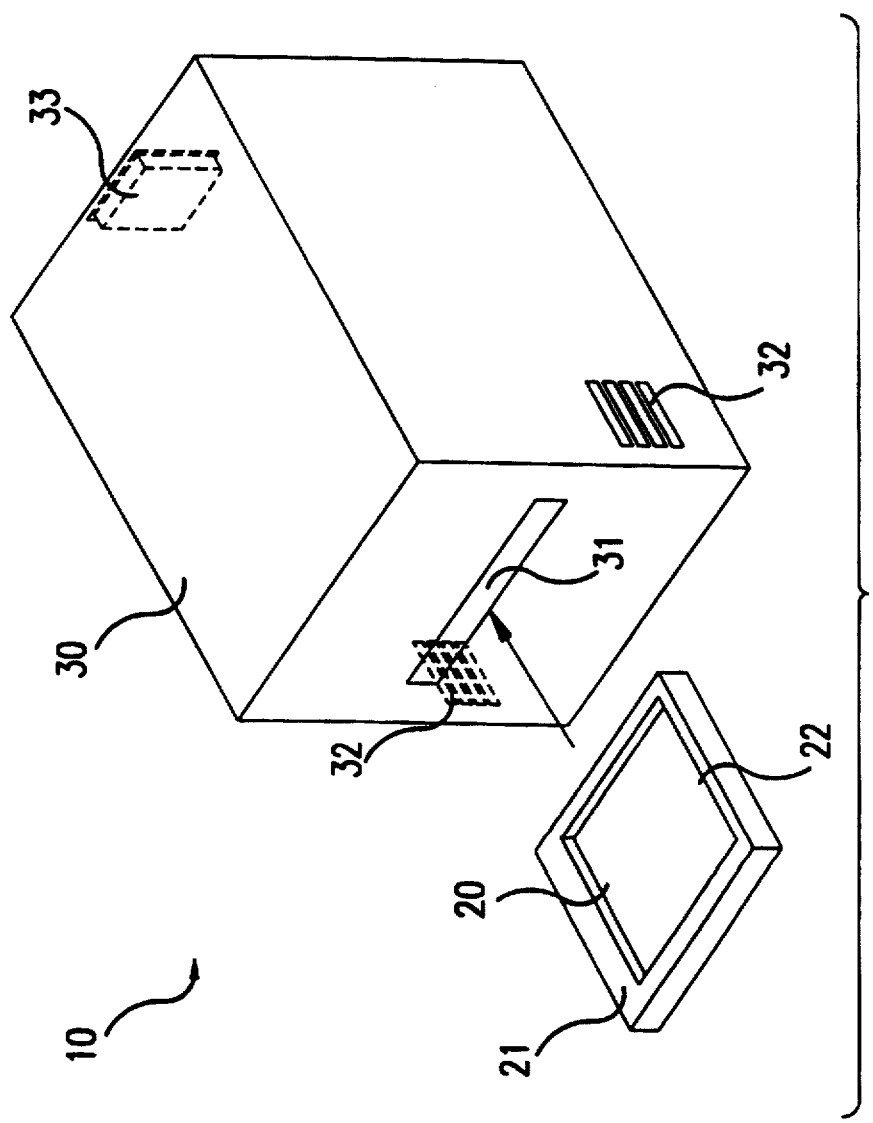
FIG. 2 is a front perspective view of the image input device of FIG. 1.

The image input device 10 includes an exterior case 30, as seen in FIG. 2, having an elongated slit 31 located on a front surface of the case 30. The original 20 is inserted in a horizontal direction through the elongated slit 31 into the image input device 10. Preferably, the original 20 is held by an original holder 21. The original holder 21 has a frame shape, for example, and holds a non-image surface surrounding an image surface of the original 20. The original holder 21 includes apertures 22 in the front and the back surfaces of the original holder 21. Alternatively, a slide mount or a device capable of holding an unmounted original 20 can also be used as the original holder 21. Moreover, the two sizes, 35 mm and 4"×5", can be used as the sizes of the original holder 21. It is also possible to design the original holder 21 to match the larger size of 4"×5", for example, and to mask the aperture 22 when a smaller size such as 35 mm size is used. Moreover, the original 20 can be made of a multiplicity of frames connected in a row, or it can be made of individual unconnected frames.

The interior of the case 30 is divided vertically into three portions such that the elongated slit 31 is positioned in the center, as depicted in the example of the device in FIG. 1. An original illumination assembly 40 for illuminating the original 20 is located in a top portion of the case 30, as shown in FIG. 1. An original scanning assembly 50 that scans the original 20 is located in the middle portion of the case 30, directly below the original illumination assembly 40. An original reading assembly 60 that reads the original 20 is located in the bottom portion of the case 30 directly below the original scanning assembly 50. The original reading assembly, generally referred to as 60 for each embodiment, is located in a front half of a front side of the case 30 near the elongated slit 31. A power source assembly 70 is positioned in a rear half of the lower portion of the case 30.

A pair of vents or intake openings 32 are located on the side surfaces of the case 30, as shown in FIG. 2. An exhaust fan 33 is located inside the case 30 behind the illumination assembly 40 to exhaust heat from the case generated by the illumination assembly 40 and the power source assembly 70. Of course, the exhaust/venting assembly can be configured and positioned in a variety of ways to maximize efficiency depending on particular design and use requirements.

As illustrated in FIG. 1, the illumination assembly 40 includes a light source 41 that illuminates the original 20. Preferably, the light source 41 includes a halogen lamp and a concave mirror 41a.

Various filter units 42, 43 and 44 are positioned between the light source 41 and the original 20. A heat absorbing filter unit 42 absorbs heat from the light source 41. The heat absorbing filter unit 42 can contain one or more filter groups containing one or more filter elements. A dispersion board filter unit 43 forms an even uniform light source surface. The dispersion board filter unit 43 contains one or more filter groups containing one or more filter elements. A color filter unit 44 includes red, green, and blue filter units that enable input of a color image by reading the same image three times, once for each color. The color filter units 43 can contain one or more filter groups containing one or more filter elements. The number of filter units is not limited to three. For example, the color filter unit 44 can be omitted for a black and white image. Additionally, for different effects more than three filter units can be provided.

As shown in FIG. 1, a first illumination lens unit 45 and a second illumination lens unit 46 are positioned between the light source 41 and the original 20. Each of the first and second illumination lens units 45 and 46 can include one or more lens groups containing one or more lens elements. In this embodiment, the first illumination lens unit 45 includes a Fresnel lens. The second illumination lens unit 46 can include a multiplicity of lens groups such as, for example, two Fresnel lenses, as shown in FIG. 1. The light emitted from the light source 41 passes through the first and second illumination lens units 45 and 46 and converges towards the back of the original 20.

In the above-identified embodiment, Fresnel lenses are used as the first and second illumination lens units 45 and 46. Normal lenses, however, can be used instead of the Fresnel lenses. Moreover, the illumination lens units are not limited to the first and second illumination lens units 45 and 46. A single set or more than three sets of lens units can be used instead of the first and second illumination lens units 45 and 46.

Illumination mirrors 47, 48 and 49 are positioned between the first illumination lens unit 45 and the second illumination lens unit 46, as shown in FIG. 1. Each of the illumination mirrors 47, 48 and 49 bends the optical axis of the illumination light from the light source 41, as depicted in FIG. 1, to direct the light to the original 20. The number of illumination mirrors 47–49 is not limited to three.

In operation, the light source 41 is positioned in the rear of the case 30. Light (referring to light rays) emitted from the light source 41 travels horizontally towards the front side of the case 30, as shown in FIG. 1. The light is reflected in a downward direction by the first illumination mirror 47. The light is then reflected by the second illumination mirror 48 towards the rear of the case 30. The light is further reflected in a downward direction by the third illumination mirror 49. The reflected light then strikes the horizontal surface of the original 20.

The present invention has the advantage that the vertical height of the original illumination assembly 40 is reduced because the optical path of the illuminating light is folded by three illumination mirrors 47, 48 and 49 and the majority of the length of the optical path is parallel to the plane of the original 20.

The original scanning assembly 50 will now be described with reference to FIG. 1. The original scanning assembly 50 includes a stage 51 to support the original holder 21. The original holder 21 is inserted through the elongated slit 31 of the case 30 onto the stage 51. The stage 51 is positioned parallel to the image plane of the original 20. An original scanning driving assembly 52 slides the stage 51 parallel to the image plane of the original 20, i.e., in a horizontal direction, as shown in FIG. 1.

The original scanning driving assembly 52 includes a stage motor 53 attached to the case 30 and a leading screw 54 rotated by the stage motor 53. A screw barrel 55 is connected to the stage 51. The leading screw 54 and the screw barrel 55 are threadably connected such that rotation of the leading screw 54 causes the screw barrel 55 to move in a horizontal direction. The horizontal movement of the screw barrel 55 produces horizontal movement of the stage 51 to permit reading of the image on the original 20. The rotation force of the stage motor 53 is converted to linear motion using the leading screw 54 and the screw barrel 55.

However, other suitable linking or cam mechanisms can be used. A guide member, not shown, extends front to back within the case and serves as a guide for stage 51.

The optical system or original reading assembly 60 will be described in connection with FIGS. 3–5. The original reading assembly 60 is located within an optical system holder 61 that is mounted in the case 30, as shown in FIG. 1. The optical system holder 61 includes a dark box with a hollow interior. An incident window 62 is located in a top surface of the box through which light enters after passing through the original 20.

The original reading assembly 60 includes an optical path switching assembly 80 that reflects the light entering through the incident window 62 into two horizontal directions. The optical path switching assembly 80 switches the entering light between a first optical path 90, shown in FIG. 3, and a second optical path 100, shown in FIG. 5. First and second optical systems 91 and 101 are positioned within the first and second optical paths 90 and 100, respectively. The first and second optical systems 91 and 101 are vertically spaced and have different magnifications.

A focusing assembly 110 performs the focusing operation of the first and second optical systems 91 and 101 and is discussed more fully below. A driving assembly, such as a step motor 120, drives the optical path switching assembly 80 and focusing assembly 110.

The optical path switching assembly 80 includes first and second reflection mirrors 81 and 82. The first reflection mirror 81 is anchored at a lower part of the optical holder 61, as shown in FIG. 3. The first reflection mirror 81 reflects the optical axis of the light entering through the incident window 62 at a right angle toward the front surface of the case 30. The second reflection mirror 82 is movably positioned between the incident window 62 and the first reflection mirror 81. The second reflection mirror 82 is rotatably supported through an anchoring axis 85 on the optical system holder 61 through a mirror frame 83. The rotation of the mirror frame 83 causes the second rotation mirror 82 to be placed within the optical path of the light entering from the incident window 62, as shown in FIG. 5.

Figure 3:
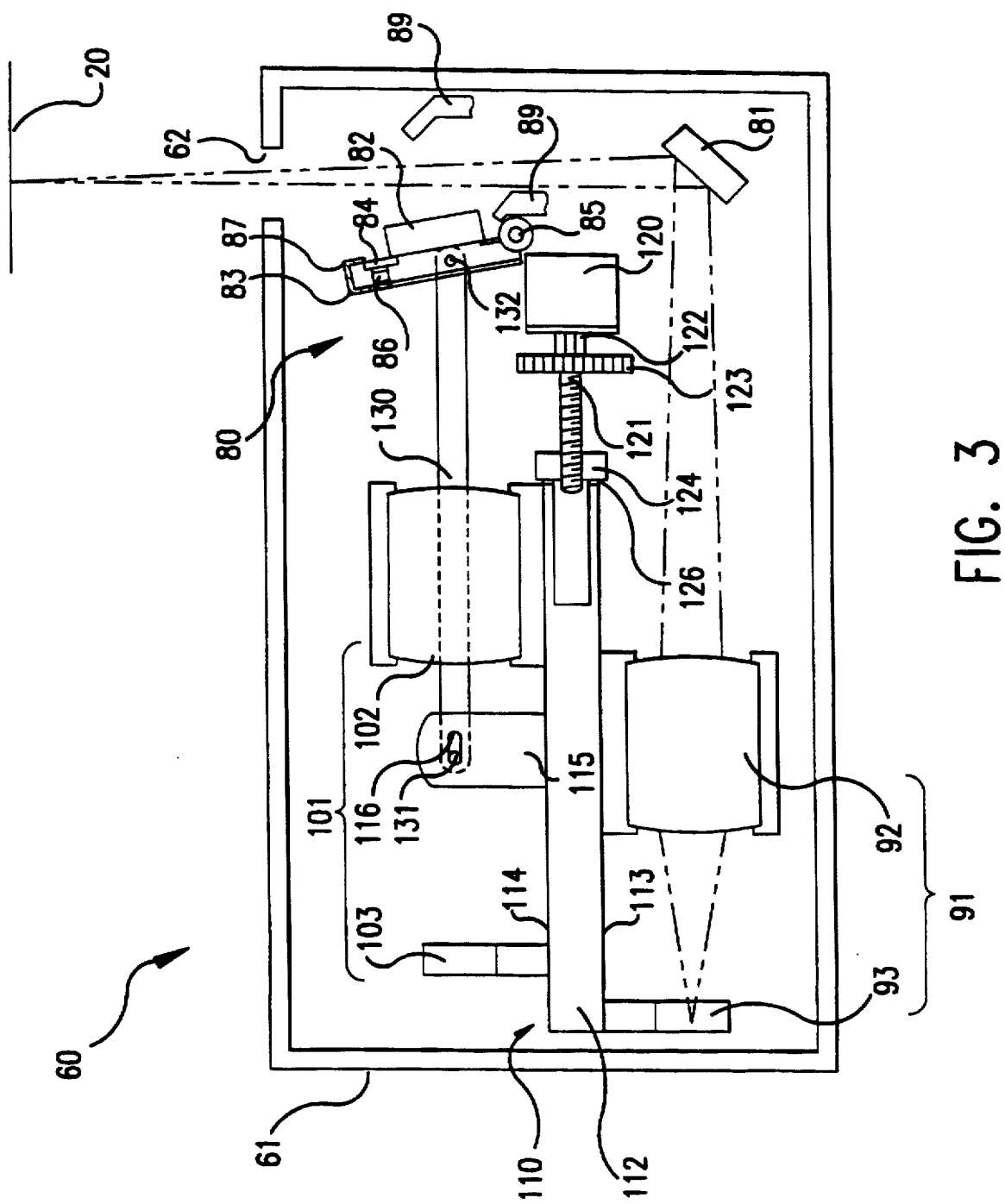
FIG. 3 is a side schematic view of an optical system holder shown in FIG. 1.
Figure 4:
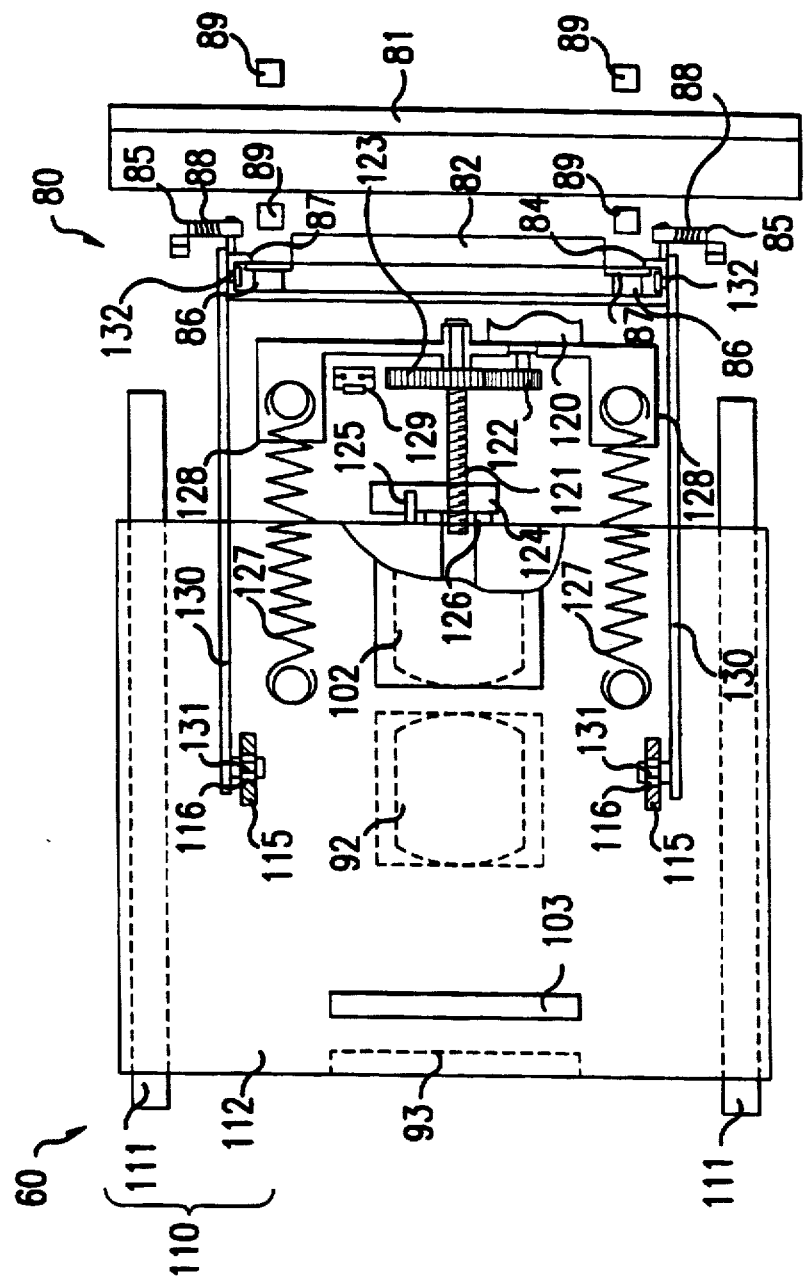
FIG. 4 is a top schematic view of the optical system holder of FIG. 3.
Figure 5:
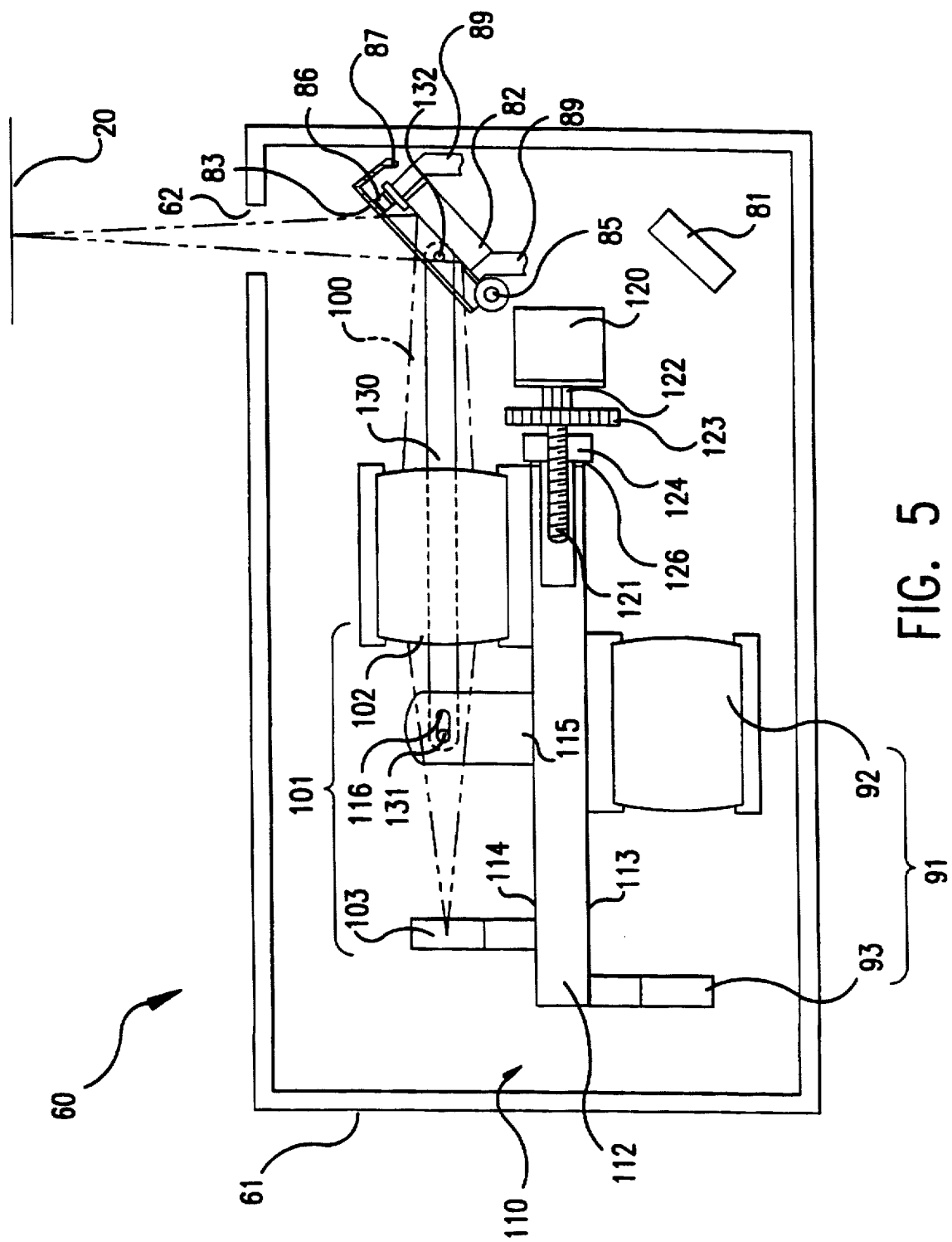
FIG. 5 is a side schematic view of FIG. 3 of the optical system holder depicting a switching condition of a reflection mirror.

The mirror frame 83 has a square notch-shaped cross section with inwardly bent tips 87, shown in FIGS. 3 and 5. The second reflection mirror 82 is anchored to a mirror anchoring board 84. The mirror anchoring board 84 is held inside the mirror frame 83 and is capable of movement in the thickness direction of the mirror frame 83. A compression spring 86 is located between a free edge of the mirror frame 83 and the mirror anchoring board 84. The spring force of the compression spring 86 causes the mirror anchoring board 84 to elastically abut an inside surface of the bent tips 87 of the mirror frame 83. A torsion spring 88 is placed on the anchoring axis 85 of the mirror frame 83, as shown in FIG. 4. The spring force of the torsion spring 88 causes rotation of the second reflection mirror 82 away from the optical path of the light entering through the incident window 62.

A pair of angle restriction members 89, coupled to the optical system holder 61, are positioned within the range of rotation of the mirror frame 83, as shown in FIG. 3–5, to limit the range of rotation of the mirror frame 83 and second reflection mirror 83. The angle restriction members 89 abut the mirror anchoring board 84 of the second reflection mirror 82. When the mirror anchoring board 84 is abutted against the angle restriction members 89, the light reflected by the second reflection mirror 82 is directed to the second optical path 100 toward the front surface of the case 30, as shown in FIG. 5.

The first optical system 91 includes a first imaging lens unit 92 and a first sensor 93. The first imaging lens unit 92 composes the light reflected from the first reflection mirror 81. The first imaging lens unit 92 can include one or more lens groups having one or more lens elements. The first sensor 93 reads an image composed by the first imaging lens unit 92.

The second optical system 101 composes the light reflected by the second reflection mirror 82. The second optical system 101 includes a second imaging lens unit 102 having a larger magnification than the first imaging lens unit 92. The second imaging lens unit 102 composes the light reflected by the second reflection mirror 82. The second imaging lens unit 102 can include one or more lens groups having one or more lens elements. A second sensor 103 reads an image composed by the second imaging lens unit 102. The first and second sensors 93 and 103 can include CCD type line sensors.

The first optical system 91 can be used, for example, with a 4"×5" sized original because the magnification of the first imaging lens unit 92 is smaller than that of the second imaging lens unit 102. The second optical system 102 can be used, for example, with a 35 mm sized original because the magnification of the second imaging lens unit 102 is larger than that of the first imaging lens unit 92.

The focusing assembly 110 includes a pair of guide rails 111 and a moving stage 112 on which the first and second optical systems 91 and 101 are anchored. The guide rails 111 horizontally extend across the case 30, as shown in FIG. 4. The moving stage 112 slides along the guide rails 111. The moving stage 112 includes a first plane 113 and a second plane 114 that face away from each other, as shown in FIG. 3. A rolling bearing such as, for example, a linear ball bearing, not shown, is located on the first plane 113 such that the stage 112 slides on the guard rail 111.

The first imaging lens unit 92 and the first sensor 93 are anchored on the first surface 113. The first imaging lens unit 92 and the first sensor 93 are spaced a fixed distance apart on the moving stage 112, as shown in FIG. 3. The second imaging lens unit 102 and the second sensor 103 are anchored on the second surface 114, as shown in FIG. 3. The second imaging lens unit 102 and the second sensor 103 are spaced a fixed distance apart. The fixed distances between the first and second lens units 92 and 102 and the first and second sensors 93 and 103 produce fixed magnifications for the first and second optical systems 91 and 101, respectively.

Movement of the moving stage 112 along the horizontal guide rails 111 enables simultaneous movement of the first and second optical systems 91 and 101. This permits focusing of both the first and second optical systems 91 and 101. Focusing of the first and second optical systems 91 and 101 is performed by changing the distances from the original 20 held by the original holder 21 to the first and second imaging lens units 92 and 102.

When a slide mount is used as the original holder 21, the position of the image plane of the original 20 often moves in the direction of the optical axis because of uneven thicknesses. As a result, focusing is performed after correcting focusing errors due to uneven thickness of the slide mount by changing each of the distances from the image plane of the original 20 to the first and second imaging lens units 92 and 102.

The moving stage 112 is moved by the step motor 120 anchored in the optical system holder 61. A leading screw 121 transfers the driving force of the step motor 120 to the moving stage 112, as shown in FIGS. 3-5. In the present embodiment, the step motor 120 is used to provide a driving force. However, other direct current/alternate current motors can also be used. The leading screw 121 is placed in the center of a horizontal plane of the moving stage 112, as shown in FIGS. 3-5. An engagement gear 123 meshing with a driving gear 122 of the step motor 120 is anchored on the screw 121. A nut 124 is screwed on the leading screw 121, as shown in FIGS. 3 and 4. The nut 124 abuts the rear end surface of the moving stage 112. The rotation of the nut 124 is restricted by a rotation restriction member 125, as shown in FIG. 4, protruding from the moving stage 112.

An interval adjustment member 126 is secured to the moving stage 112 at a location where the nut 124 abuts the moving stage 112, as shown in FIGS. 3-5. The location at which the nut 124 abuts the moving stage 112 is adjustable by changing the thickness of the interval adjustment member 126. This is necessary to correct for uneven thicknesses due to the precision required in manufacturing and assembling the lens units and mechanical parts.

A pair of draw-springs 127 mounted symmetrically with respect to the leading screw 121 function as a force applying assembly, as shown in FIG. 4. One end of each of the left and right draw-springs 127 is anchored respectively on the left and right sides of the moving stage 112. An opposite end of each of the draw-springs 127 is anchored on the optical system holder 61 through a stopper 128, as shown in FIG. 4.

The restoration forces of the left and right draw-springs 127 bias the interval adjustment member 126 of the moving stage 112 in the direction of the nut 124. When the leading screw 121 is rotated by the step motor 120, the position of the nut 124 moves forward and backward, causing the moving stage 112 to slide with the nut 124. The rotational force of the step motor 120 is converted into linear motion by the leading screw 121 and the nut 124. However, other linking mechanisms or a cam mechanism can also be used. The draw-springs 127 are used as a force applying assembly; however, other compressed springs or board springs can be used.

Figure 6:
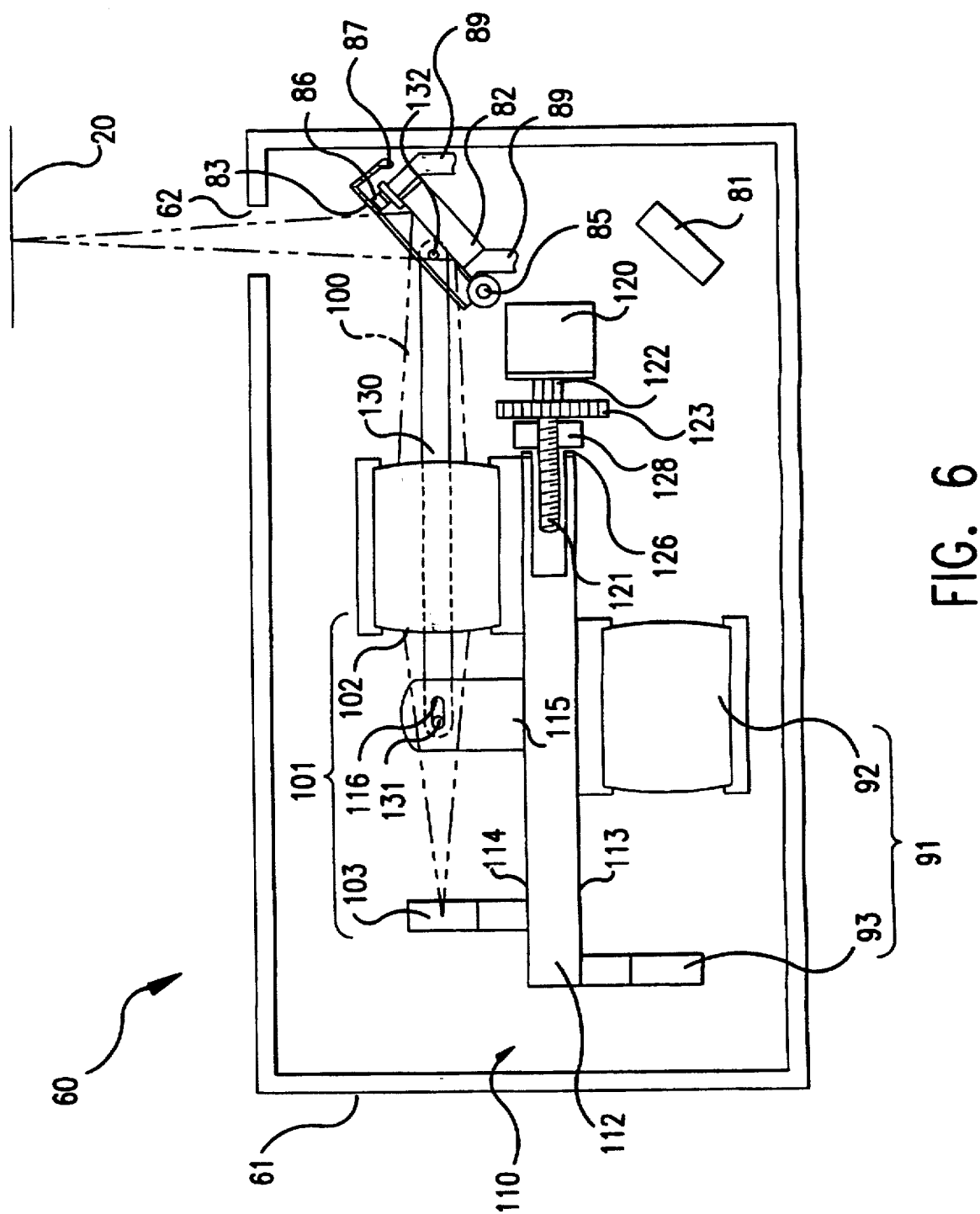
FIG. 6 is a side schematic view of the optical system holder of FIG. 3 during transport.
Figure 7:
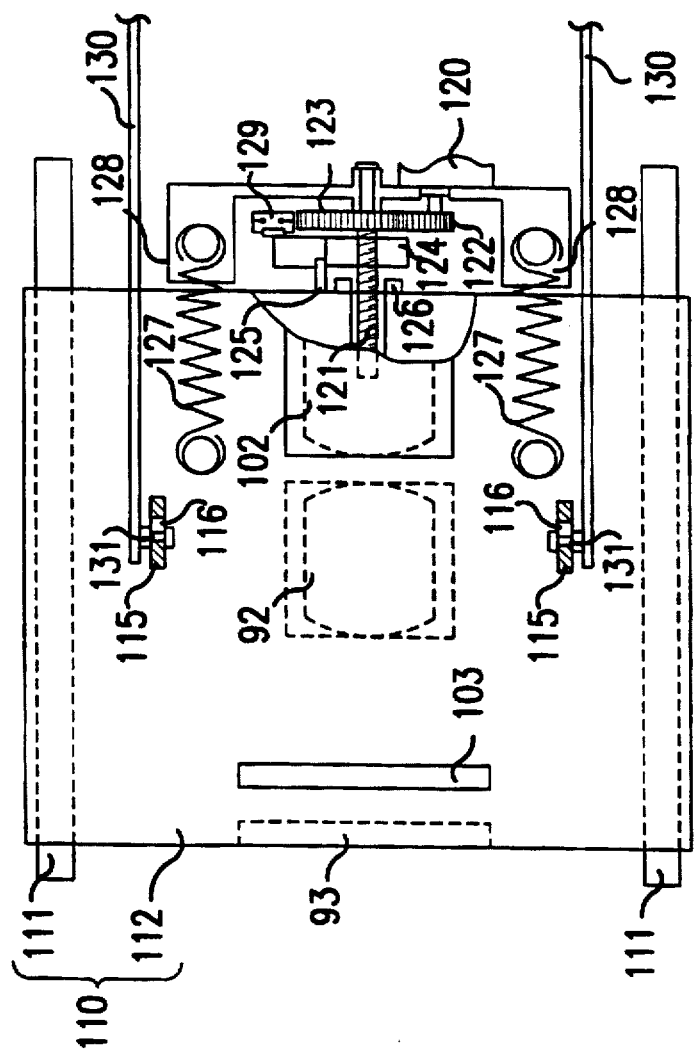
FIG. 7 is partial top schematic view of the optical system holder of FIG. 6 during transport.

The stopper 128 controls the final movement position of the moving stage 112. The stopper 128 is anchored on the optical system holder 61. The final movement of the moving stage 112 is regulated by the stopper 128 that abuts the rear surface of the moving stage 112 as shown in FIG. 7. If the leading screw 121 further rotates while the stopper 128 abuts the moving stage 112, the nut 124 moves away from the interval adjustment member 126 in the moving stage 112, as shown in FIGS. 6 and 7. This interrupts the transfer of the driving power between the step motor 120 and the moving stage 112.

A position sensor 129 such as, for example, a limit sensor is placed at the final movement position of the nut 124, as shown in FIG. 4. The location of the step motor 120 is determined by the detection signal from the position sensor 129.

A pair of left and right connection members 130 is located between the moving stage 112 and the reflection mirror 82 to transfer the motion force of the moving stage 112 to the second reflection mirror 82. Each connection member 130 has a connecting pin 131 and a moving axle 132 located on opposite ends of the connecting member 130. The connecting pins 131 of the left and right connecting members 130 are axially supported by a pair of support members 115. The support members 115 are tongue-like protrusions that project from the upward-facing second surface 114 of the moving stage 112, as shown in FIGS. 3-5.

Each support member 115 includes an elongated or oblong hole 116 extending in the horizontal direction, as shown in FIGS. 3. The connecting pin 131 extends through each of the elongated holes 116 such that the connecting pin 131 moves along the elongated hole 116. Each movement axle 132 is axially supported to the mirror frame 83 of the second reflection mirror 82, as shown in FIGS. 3 and 4.

When each connecting pin 131 is located in the center of the elongated hole 116 of the moving stage 112, as shown in FIGS. 3 and 4, only the connecting pin 131 moves within the elongated hole 116. In this arrangement, the connecting members 130 do not move if the moving stage 112 slides even slightly in the front and back directions. This permits focusing of the first optical system 91 and defines a movement range for focusing the first optical system 91. Here, the second reflection mirror 82 separates from the optical path of the light entering from the incident window 62 due to the spring force of the torsion spring 88. Thus, the optical path of the second reflection mirror 82 is switched to the first optical system 91.

When the moving stage 112 moves while the connecting pin 131 abuts the rear edge of the elongated hole 116, the connecting members 130 also move. The connecting members 130 are pushed by the rear edge of the elongated hole 116, as shown in FIG. 5. As a result, the mirror frame 83 rotates clockwise against the spring force of the torsion spring 88 around the anchoring axle 85. When the mirror anchoring board 84 abuts the angle restriction member 89, the second reflection mirror 82 is positioned within the optical path of the light entering from the incident window 62. The optical path of the light entering from the switches to the second optical system 101. This movement defines a moving range for switching the optical path of the second mirror 82. The second reflection mirror 82 is rotated with the connecting members 130, as described above. However, other linking mechanisms or a cam mechanism can be employed.

When the moving stage 112 further moves while the connecting pin 131 continues to abut the rear edge of the elongated hole 116, the connecting members 130 also further move by being pushed by the rear edge of the elongated hole 116. At this time, each moving axle 132 also moves, causing further clockwise rotation of the mirror frame 83. However, due to the abutment of the mirror anchoring board 84 to the angle restriction member 89, the compression spring 86 elastically contracts, causing the movement amount of each moving axle 132 to be absorbed. As a result, only the moving stage 112 moves while the angle of the second reflection mirror 82 remains the same. This permits focusing of the second optical system 101 and defines a movement range for focusing of the second optical system 101.

When the moving stage 112 further moves, the compression spring 86 further contracts, and the rear surface of the moving stage 112 for focusing abuts the stopper 128, as shown in FIG. 7. When the leading screw 121 rotates further, the nut 124 moves away from the interval adjustment member 126 of the moving stage 112, as shown in FIGS. 6 and 7, causing interruption of the driving force. This position of the moving stage 112 defines the moving range for transporting the image input device.

As described above, the moving stage 112 includes four moving ranges, namely, the moving range for focusing of the first optical system 91, the moving range for optical path switching, the moving range for focusing of the second optical system 101, and the moving range for transporting.

The position where the nut 124 abuts the position sensor 129 defines the location of the origin, as shown in FIG. 7. At the location of the origin, the moving range of the moving stage 112 is the moving range for transporting, and the nut 124 is separated from the interval adjustment member 126 of the moving stage 112. As the nut 124 moves forward from the location of the origin, the moving range moves consecutively through the moving range for focusing of the second optical system 101, the moving range for optical path switching, and the moving range for focusing of the first optical system 91.

The moving range for transporting is distinct from the moving ranges for focusing of both optical systems to maintain the movement accuracy of the moving stage 112 within the focus adjustment range. The transfer of the driving force from the step motor 120 to the moving stage 112 is interrupted during the moving range for transporting. This reduces the impact on movement accuracy due to the vibration of the step motor 120 during transport of the image input device.

Moreover, the mirror anchoring board 84 of the second reflection mirror 82 is pushed against the angle restriction member 89 during the moving range for transporting due to an elastic contraction of the compression spring 86. This prevents rattling of the second reflection mirror 82.

The relationship of the amount of force of the draw-spring 127, the torsion spring 88, and the compression spring 86, will be now be described. Taking transfer efficiency rates of component elements other than the three types of springs into consideration, the amount of force F1 of the draw-spring 127, the amount of force F2 of the torsion spring 88, and the amount of force F3 of the compression spring 86 are computed in terms of the amount of force associated with the nut 124, which pushes the moving stage 112. The forces F1, F2, and F3 satisfy the following relationship. The mirror anchoring board 84 is assumed to be abutting the angle restriction member 89.

$$F1 > F2 + F3 \tag{1}$$

The following relationship is satisfied by a force associated with the mirror anchoring board 84.

$$F3 > F2 \tag{2}$$

In relationship (1), F1 denotes the force that moves the moving stage 112, and F2+F3 denotes the opposite force that moves the moving stage 112 in an opposite direction.

In relationship (2), F3 denotes the force that rotates the mirror anchoring board 84 clockwise around the anchoring axle 85, and F2 denotes the opposite force that rotates the mirror board 84 counterclockwise. From relationship (1), the amount of force F1 of the draw-spring 127 is dominant even after the mirror anchoring board 84 abuts the angle restriction member 89. Thus, a condition can be maintained in which the interval adjustment member 126 of the moving stage 112 abuts the nut 124. Moreover, the step motor 120 can utilize the force obtained (i.e., F1−(F2+F3)) to move the moving stage 112. Furthermore, the amount of force F3 of the compression spring 86 is not generated prior to the mirror anchoring board 84 abutting the angle restriction member 89. As a result, the step motor 120 can utilize the force (F1−F2) to move the moving stage 112.

From relationship (2), elastic contraction of the compression spring 86 that occurs when the mirror anchoring board 84 abuts the angle restriction member 89 can be prevented.

The operation of the image input device 10 will now be discussed. When 4"×5" sized originals are used, for example, as the original 20, the optical path switching assembly 80 switches the optical path of light from the first optical path 90.

The user of the image input device 10 may input the size of the original 20 to be read. A controller, not shown, based on the input size then controls the operation of the switching assembly 80 to switch the optical path of the light to either the first optical path 90 or the second optical path 100. Alternatively, the image input device 10 may be equipped with a sensing assembly, not shown, that determines the size of the original 20 on stage 51. The controller based on the determined size then controls the operation of the switching assembly 80 to switch the optical path of the light to either the first optical path 90 or the second optical path 100.

The light from the original 20 is composed on the first sensor 93 through the first imaging lens unit 92 after being reflected by the first reflection mirror 81. The image of one line is read. The moving stage 112 is then moved within the moving range for focusing of the first optical system 91 until the moving stage 112 is stopped at the optimum focusing position. The optimum focusing position is based on the difference in contrast of the images being read. When focusing is completed, the image of the original is read in two dimensions by moving the original 20 in the sub-scan direction by the original scanning assembly 52.

When 35 mm sized originals are used, for example, as the original 20, the moving stage 112 is moved within the moving range for optical path switching. The optical path is switched to the second optical path 100 by the optical path switching assembly 80, as shown in FIG. 5. The light from the original 20 is composed on the second sensor 103 through the second imaging lens unit 103 after being reflected by the second reflection mirror 82. The image of one line is read. The moving stage 112 is then moved within the moving range for focusing of the second optical system 101 until the moving stage 112 is stopped at the optimum focusing position. The optimum focusing position is based on the difference in contrast of the images being read.

Figure 8A:
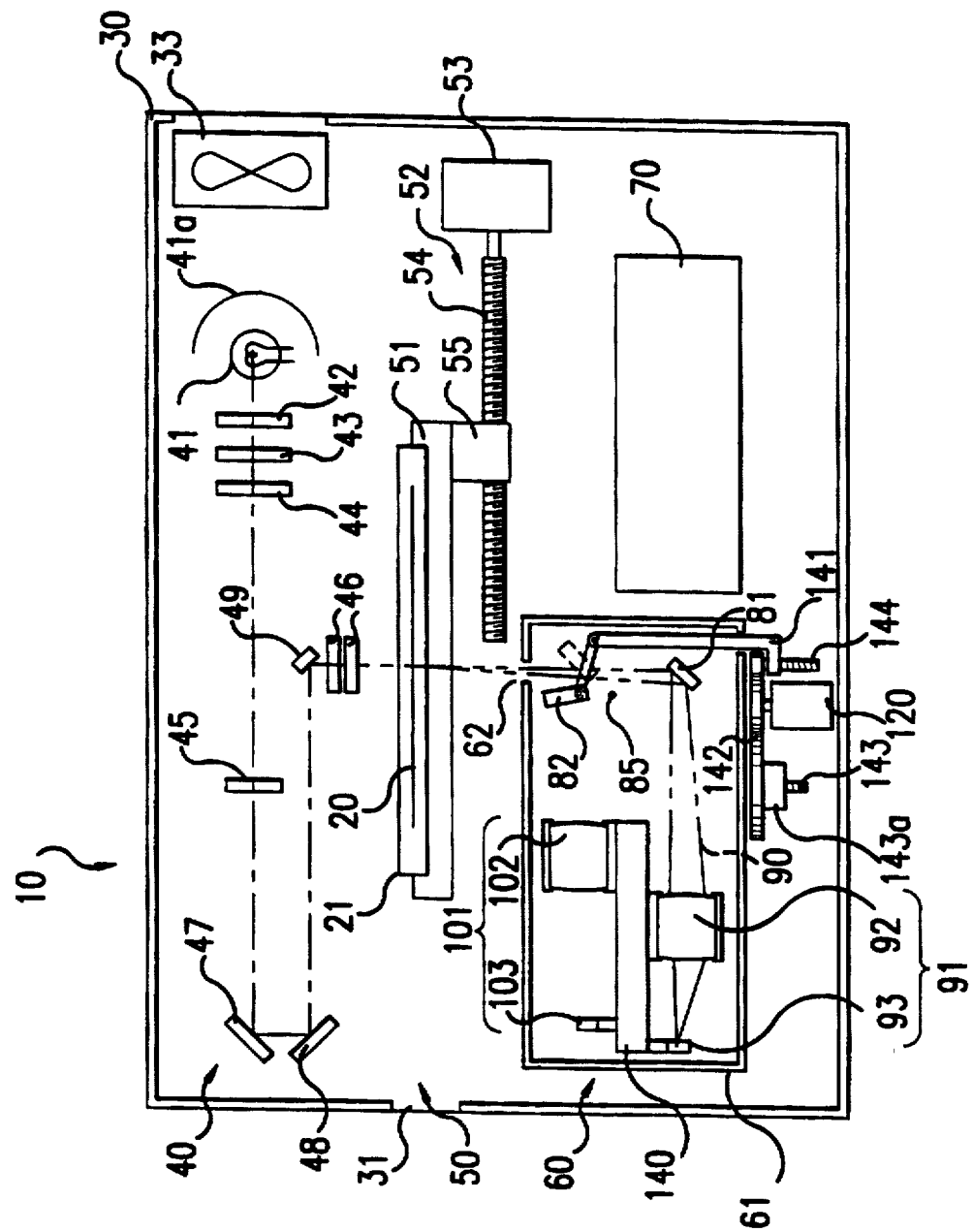
FIG. 8A is a side schematic view of another embodiment of the image input device.
Figure 8B:
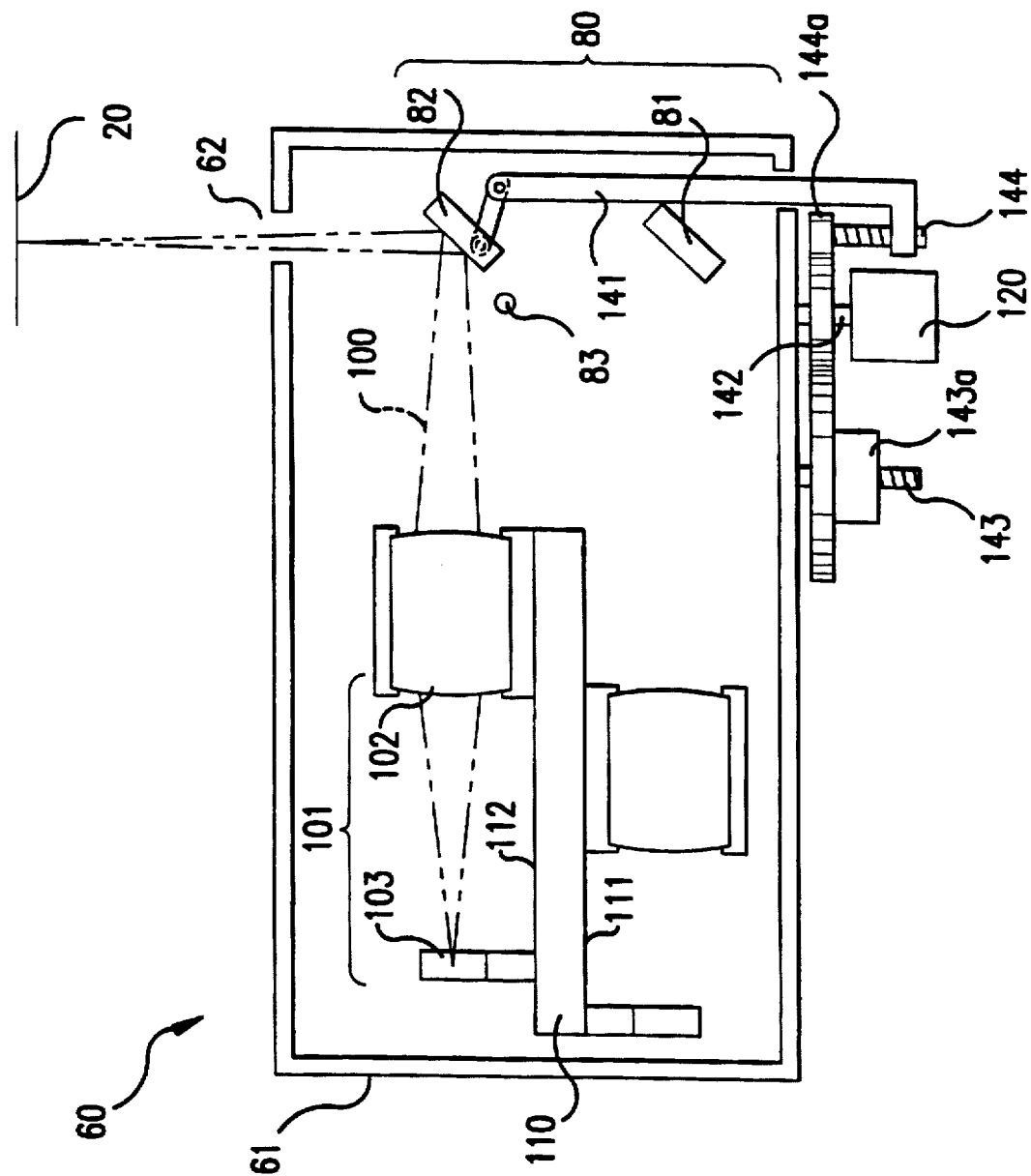
FIG. 8B is a schematic side view of the optical system holder of the embodiment shown in FIG. 8A.

FIGS. 8A and 8B illustrate another embodiment of the image input device according to the present invention. In the embodiment of FIGS. 8A and 8B, focusing is performed by moving the entire optical system holder 61 with respect to the original holder 21, rather than moving the moving stage 112, as described above. The first and the second optical systems 91 and 101 are attached to the anchoring stage 140 that is anchored inside the optical system holder 61, as shown in FIGS. 8A and 8B.

A step motor 120 is located within the case 30 beneath the optical system holder 61, as shown in FIG. 8A. A switching lever 141 is located between the step motor 120 and the second reflection mirror 82. The second reflection mirror 82 is connected to a top edge of the switching lever 141, as shown in FIGS. 8A and 8B.

An output gear 142 is attached to the output axle of the step motor 120. An optical system movement leading screw 143 and a leading screw 144 are placed on opposite sides of the output gear 142, as shown in FIG. 8B. The optical system movement leading screw 143 is capable of performing a focusing operation. The leading screw 144 switches the optical path between the first and second optical paths 90 and 100, respectively.

A top edge of the optical system movement leading screw 143 is attached to the bottom of the optical system holder 61. The optical system moving leading screw 143 is vertically oriented and parallel to the optical axis of the light entering through the incident window 62.

A screw barrel 143a having gears that mesh with the output gear 142 is fitted on the optical system moving leading screw 143. When the output gear 142 is rotated by the driving force of the step motor 120, 143 screw barrel 143a also rotates. With the rotation of the screw barrel 143a, the optical system moving leading screw 143 that fits inside the screw barrel 143a moves vertically. Thus, the entire optical system holder 61 on which the optical system moving leading screw 143 is anchored also moves vertically. With the vertical movement of the optical system holder 61, the distances of the first and second imaging lens units 92 and 102 change with respect to the original 20 that is held by the original holder 21, enabling a focusing operation.

The leading screw 144 for switching the optical path includes a gear 144a that meshes with the output gear 142. The gears formed with the screw barrel and the gears formed with the leading screw 144 mesh simultaneously with the output gears 142. A screw barrel is formed in the bottom edge of the switching lever 141 and fitted into the leading screw 144, as shown in FIGS. 8A and 8B.

When the output gear 142 is rotated by the driving force of the step motor 120, the leading screw 144 rotates and the switching lever 141 moves vertically. With the vertical movement of the switching lever 141, the second reflection mirror 82 connected to the top edge of the lever 141 rotates around the rotational axis 83 to the position shown in dotted lines in FIG. 8A. The rotation of the second reflection mirror 82 permits switching between the first and second optical paths 90 and 100.

The rotation force of the step motor 120 is converted to linear motion by the output gear 142 and the two leading screws 143 and 144, but other linking mechanisms or a cam mechanism can also be used. Additionally, a clutch mechanism can be provided between the output gears 142 and the two leading screws 143 and 144 to alternatively drive the two leading screws 143 and 144.

One of the first and second imaging lens units 92 and 102 in FIGS. 8A and 8B can be arranged such that the range of focus depth of the second imaging lens unit 102, for example, is contained within the range of the focus depth of the other, the first imaging lens unit 92, for example. By making the range of the focus depth of the second imaging lens unit 102 contained within the range of the focus depth of the first imaging lens unit 92 and by focusing the second optical system 101 with a shallower or narrower focus depth through vertical movement of the optical holder 61, focusing of the first optical system 91 with a deeper or wider focus depth is simultaneously performed. This is advantageous because it performs focusing of both the first and the second optical systems 91 and 101, simultaneously.

Figure 9:
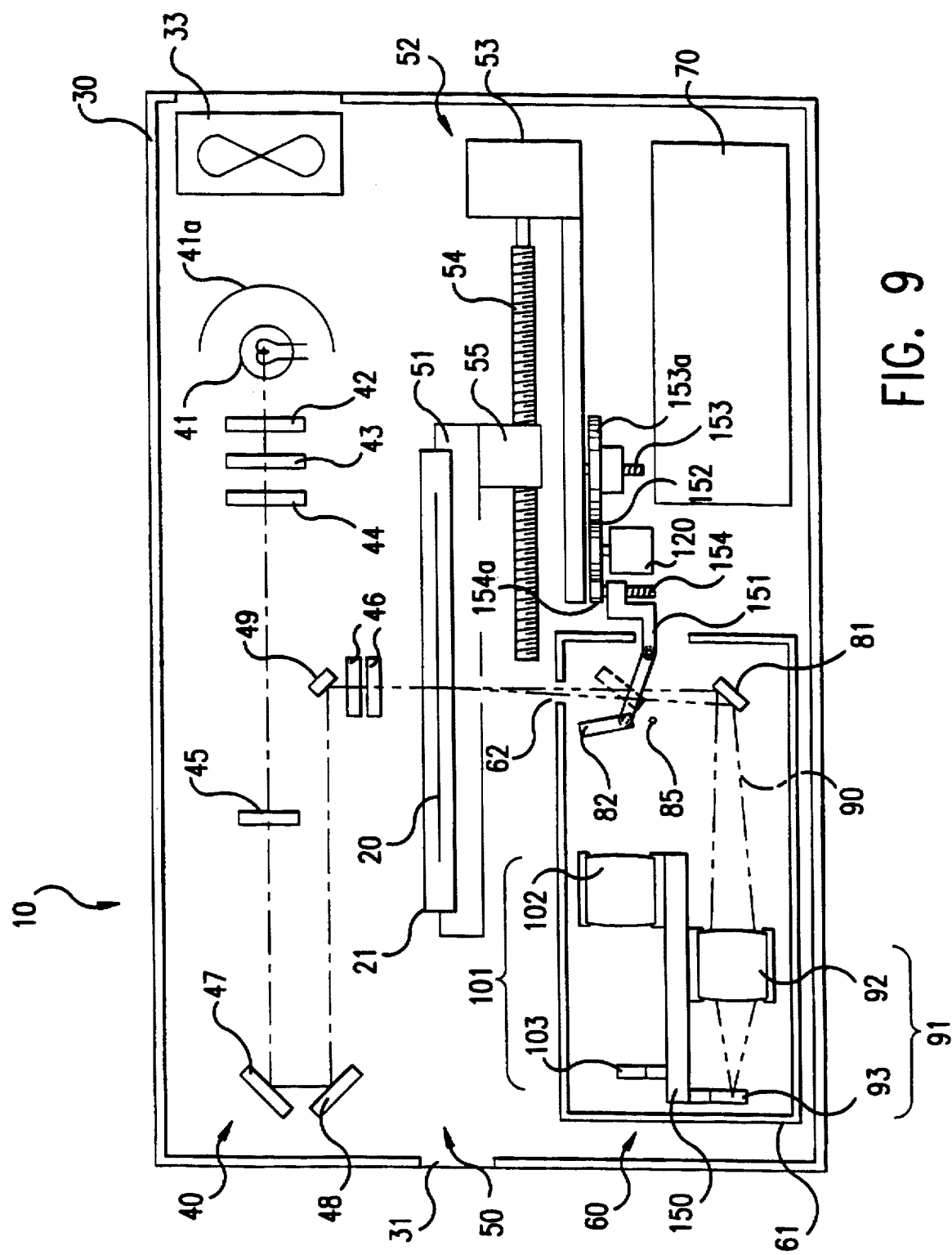
FIG. 9 is a side schematic view of another embodiment of the image input device.

FIG. 9 illustrates another embodiment of the image input system according to the present invention. The optical system holder 61 is not moved. Rather, the original holder 21 is moved with respect to the optical system holder 61 to perform focusing. The first and second optical systems 91 and 101 are connected to the anchoring stage 150 within the inside of the optical system holder 61, as shown in FIG. 9.

A step motor 120 is located beneath the leading screw 54. A switching lever 151 is located between the step motor 120 and the reflection mirror 82, as shown in FIG. 9. The second reflection mirror 82 is connected to a front edge of the switching lever 151. Output gears 152 are attached to the output axle of the step motor 120, as shown in FIG. 9.

A leading screw 153, and a leading screw 154 are located on opposite sides of the output gears 152, as shown in FIG. 9. The leading screw 153 is capable of moving the original 20 and performing a focusing operation. The leading screw 144 switches the optical path between the first and second optical paths 90 and 100, respectively.

The top edge of the leading screw 153 is connected to the stage 51 through the stage motor 53, the leading screw 54 for scanning, and the screw barrel 55. The leading screw 153 is positioned parallel to the optical axis of the light entering the optical system holder 61 through the incident window 62.

A screw barrel 153a having gears meshing with the output gears 152 is connected the leading screw 153, as described in FIG. 9. When the output gears 152 are rotated by the step motor 120, the screw barrel also rotates. With the rotation of the screw barrel 153a, the leading screw 153 moves vertically. As a result, the stage 51, the stage motor 53, the leading screw 54, and the screw barrel 55 also move vertically. The vertical movement of the stage 51 changes the distances between the first and second imaging lens units 92 and 102 and the original holder 21, thus, performing the focusing operation.

The leading screw 154 includes gears 154a that mesh with the output gear 152, as shown in FIG. 9. Hence, the gears of the screw barrel 153a and the gears 154a of the leading screw 154 simultaneously mesh with the output gears 152.

A screw barrel formed in the rear edge of the switching lever 151 is connected to the leading screw 154. When the output gear 152 is rotated by the step motor 120, the leading screw 154 rotates. The rotation of the leading screw 154 causes the switching lever 151 to move vertically. The vertical movement of the switching lever 151 causes the second reflection mirror 82 connected to the front edge of the lever 151 to rotate around its rotational axis 85 to a position shown by dotted lines in FIG. 9. The rotation of the second reflection mirror 82 permits switching between the first and second optical paths 90 and 100. As described above in connection with the embodiment of FIGS. 8A and 8B, the rotation force of the step motor 120, in FIG. 9, is converted to linear motion by the leading screw 153 and the leading screws 154, but other linking mechanisms or a cam mechanism can also be used. Additionally, a clutch mechanism can be provided between the output gears 152 of the step motor 120 and the two leading screws 153 and 154 to drive the two leading screws 153 and 154.

The embodiment depicted in FIG. 9 is similar to the embodiment depicted in FIGS. 8A and 8B because one of the first and second imaging lens units 92 and 102 can be arranged such that the range of focus depth of the second imaging lens unit 102, for example, is contained within the range of the focus depth of the other, the first imaging lens unit 92, for example. By making the range of the focus depth of the second imaging lens unit 102 contained within the range of the focus depth of the first imaging lens unit 92 and by focusing the second optical system 101 with a shallower or narrower focus depth through the vertical movement of the original holder 21, the focusing of the first optical system 91 with a deeper or wider focus depth is simultaneously performed. This is advantageous because it performs focusing of both the first and the second optical systems 91 and 101 simultaneously.

The image input device according to the present invention has a reduced size by driving the optical switching assembly and the focusing assembly using common drive assembly. Furthermore, the image input device is capable of handling originals of various sizes.

In addition, the image input device is capable of simultaneous focusing for originals with different sizes. Furthermore, it is possible to switch sizes of originals while the focusing operation is in progress.

Figure 10:
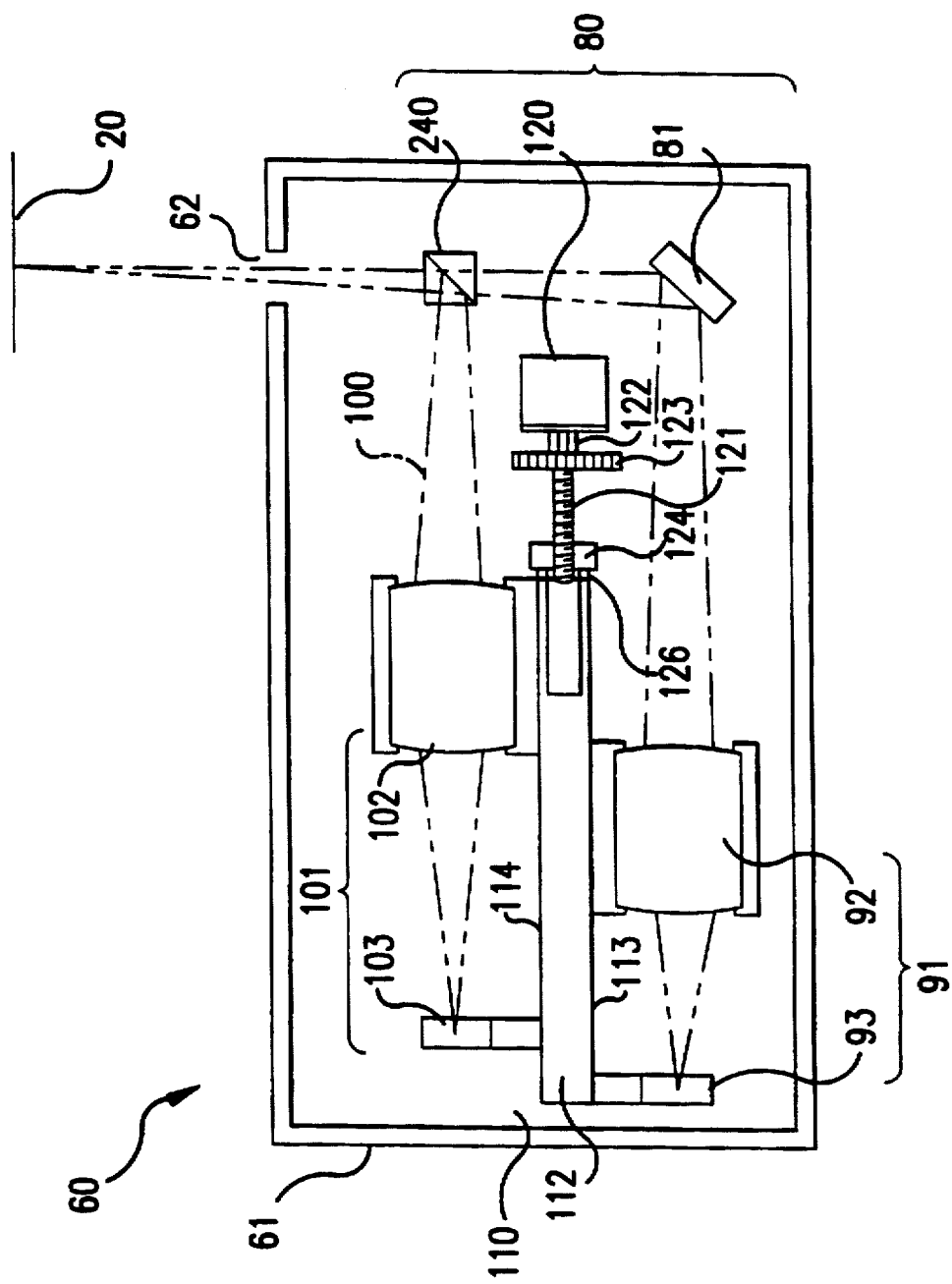
FIG. 10 is a side schematic view of the optical system holder of another of the image input device.

Another embodiment of an optical system holder 61 for use in the image input device according to the present invention, is depicted in FIG. 10. The optical system holder of FIG. 10 includes a half mirror instead of the second reflection mirror 82. A half mirror 240 is located between the incident window 62 of the optical holder 61 and the first reflection mirror 81. The half mirror 240 is secured within the optical holder 61 to maintain a 45° inclination angle with respect to the optical axis of the light entering through the incident window 62. A part of the light entering through the incident window 62 penetrates the half mirror 240 and enters the first reflection mirror 81, as shown in FIG. 10. Another part of the penetrating light entering through the incident window 62 is reflected by the half mirror 240 and is composed on the second sensor 103 through the second imaging lens unit 102, as shown in FIG. 10. When the half mirror 240 is used, the illuminance of the first and second sensors 93 and 103 decreases. Therefore, it is desirable to increase the illuminance of the light source 41. In the embodiment of FIG. 10, switching of the second reflection mirror 82 is not necessary, which enables further simplification and miniaturization of the structure of the optical path changing assembly 80. This produces an image input device with a high level of reliability that is capable of handling originals with different sizes while reducing the load for the driving assembly.

Figure 11:
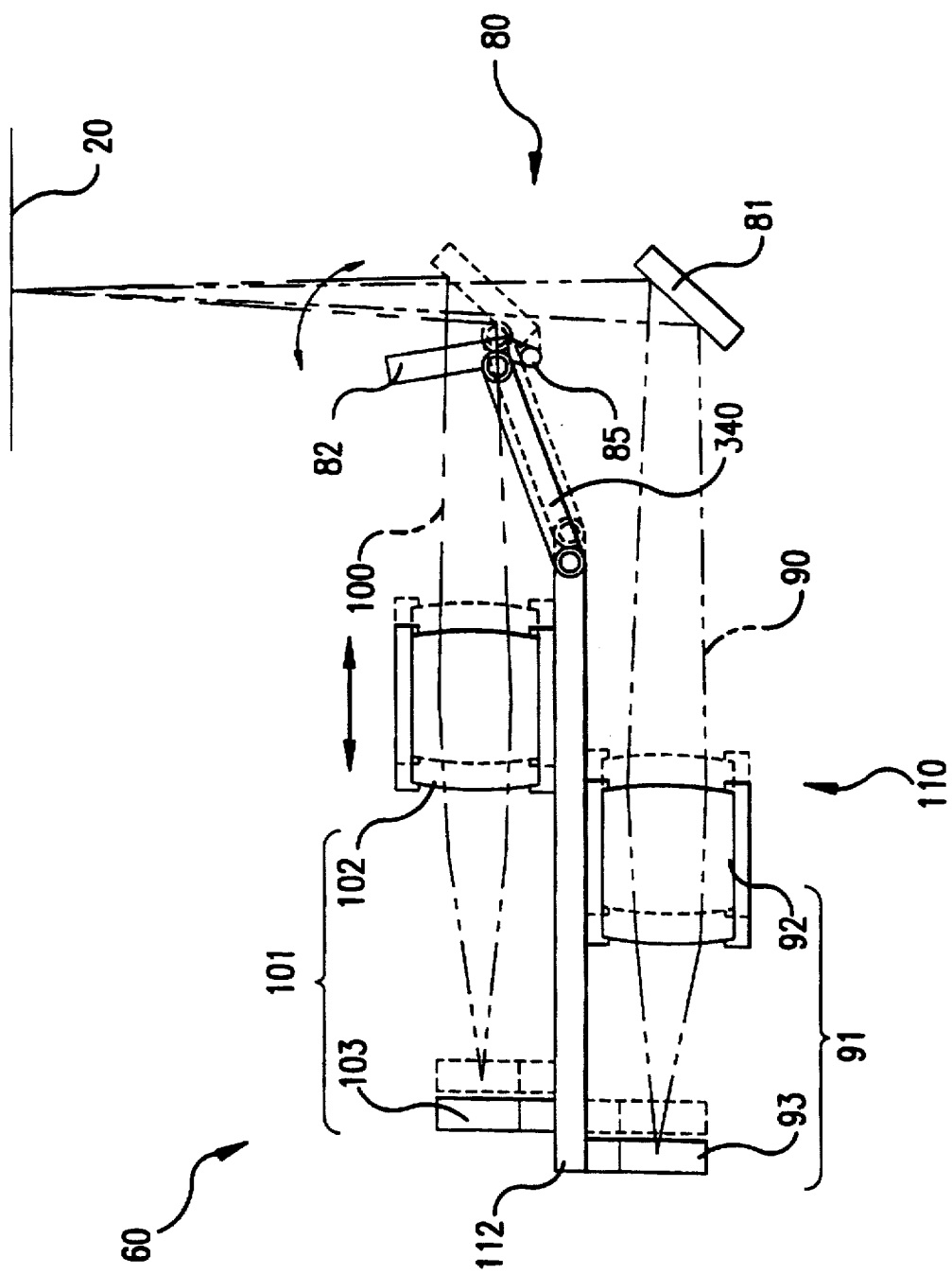
FIG. 11 is a schematic view of another embodiment of the optical system according to the present invention.

Another embodiment of the original reading assembly 60 for use in the image input device according to the present invention is depicted in FIG. 11. A connecting member 340 is axially supported on a back edge of the moving stage 112. The second reflective mirror 82 is axially supported on the end of the connecting member 340.

In FIG. 11, the solid lines indicate positions of the original reading assembly 60 prior to movement of the moving stage 112, while the dotted lines show positions following such movement. Furthermore, the first optical path 90 prior to movement is shown in the drawing by a "double broken" line, while the second optical path 100 following movement is shown by a "triple broken" line.

With this embodiment, it is possible to adjust the focus of the first and second optical systems 91 and 101 by moving the moving stage 112, as discussed above in connection with FIGS. 3 and 4. When the moving stage 112 is at the position indicated by the solid lines in FIG. 11, the second reflective mirror 82, which is axially supported on the connecting member 340, is pivoted out of the optical path of the light entering from the incident window from the original 20. The light is then reflected by the first reflective mirror 81 and follows the first optical path 90.

When the moving stage 112 moves to the position of the dashed line, shown in FIG. 11, the second reflective mirror 82 protrudes into the optical path of the light from the original 20. The light is reflected by the second reflective mirror 82 and switched to the second optical path 100.

In the embodiment of FIG. 11, the switching of the first and second optical paths 90 and 100 and the focus adjustment of the first and second optical systems 91 and 101 is performed by moving the moving stage 112. The switching of the first and second optical paths 90 and 100 and the focus adjustment of the first and second optical systems 91 and 101 may be performed independently by moving the connecting member 340 with the moving stage 112 and a separate driving source.

Figure 12:
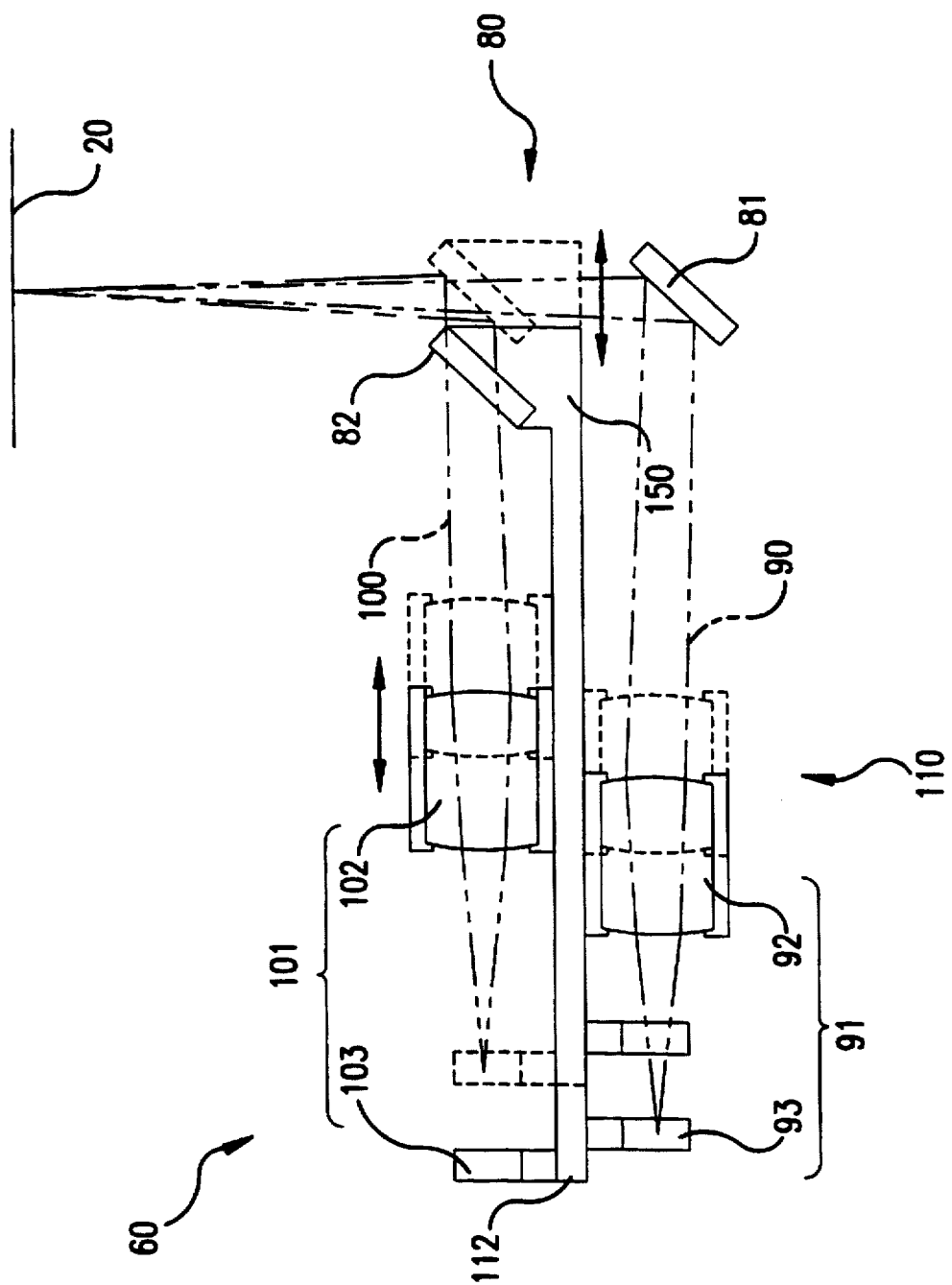
FIG. 12 is a schematic view of another embodiment of the optical system according to the present invention.

Another embodiment of the original reading assembly 60 for use in the image input device according to the present invention is depicted in FIG. 12. The second reflective mirror 82 is integral with and moves parallel to the moving stage 112. A mirror fixing unit 150 of the second reflective mirror 82 is located on the back edge of the moving stage 112. Additionally, the second reflective mirror 82 is fixed to the mirror fixing unit 150 so as to have a 45° angle with respect to the optical axis of the light entering the optical system from the original 20.

The position of the original reading assembly 60 prior to movement of the moving stage 112 is shown by solid lines in FIG. 12. The position of the original reading assembly 60 following movement is indicated by the dashed lines. The first optical path 90 prior to movement is shown in the drawing by the "double broken" line. The second optical path 100 following movement is shown by "triple broken" line. It is possible to adjust focus of the first and second optical systems 91 and 101 by moving the moving stage 112, as described above.

When the moving stage 112 is at the position of the solid lines, shown in FIG. 12, the second reflective mirror 82 is separated from the optical path of the light from the original 20. The light from the original 20 is reflected by the first reflective mirror 81 and advances along the first optical path 90.

When the moving stage 112 moves to the position represented by the dashed lines in FIG. 12, the second reflective mirror 82 protrudes into the optical path of the light from the original 20. The light is reflected by the second reflective mirror 82 and switched to the second optical path 100. With this arrangement, the number of components is reduced because the rotation angle of the second reflective mirror 82 need not be changed, and additional connecting members are unnecessary.

Figure 13:
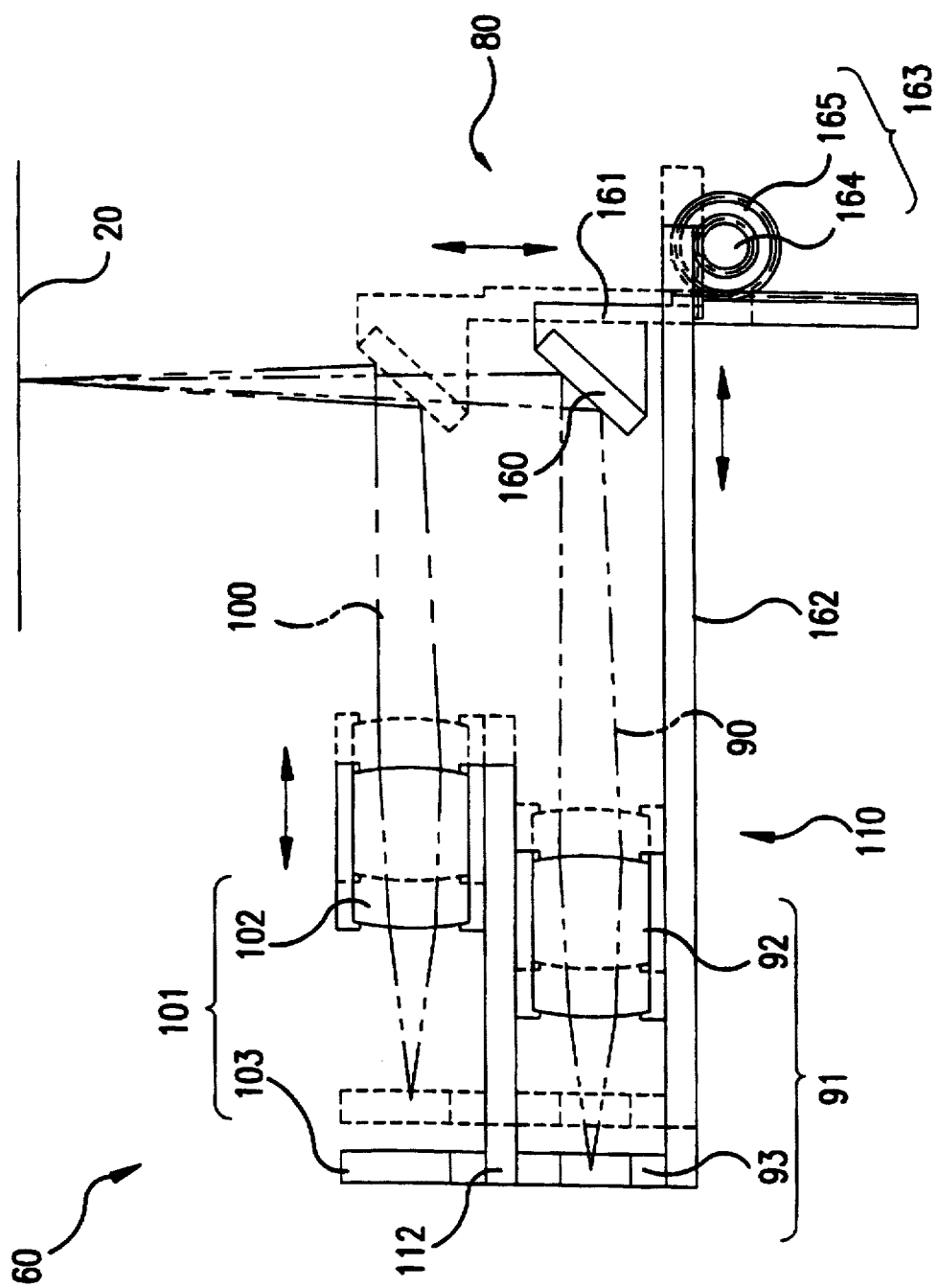
FIG. 13 is a schematic view of another embodiment of the optical system according to the present invention.

Another embodiment of the original reading assembly for use in the image input device according to the present invention is depicted in FIG. 13. In the embodiment depicted in FIG. 13, the first and second reflective mirrors 81 and 82 are composed of a single reflective mirror 160. The image input device 10 according to the embodiment of FIG. 13 includes an optical path switching rack 161 on which the single reflective mirror 160 is fixed. The moving stage 112 having the first and second optical systems 91 and 101 is integrally fixed to a focus adjustment rack 162. A driving gear 163 meshes with both racks 161 and 162 to move the racks 161 and 162. The driving gear 163 includes a small diameter gear 164 and a large diameter gear 165. The driving gear 163 is rotated by a stepping motor, not shown.

The optical path switching rack 161 moves parallel to the optical axis of the light from the original 20, as shown in FIG. 13. A reflective mirror 160 is fixed on the top edge of the optical path switching rack 161. The mirror 160 is fixed at a 45° angle with respect to the optical axis of the light from the original 20. A back edge of the optical path switching rack 161 meshes with a large diameter gear 165 of the driving gear 163. A back edge of the focus adjustment rack 161 crosses the optical path switching rack 162, as shown in FIG. 13. The back edge of the rack 162 meshes with the small diameter gear 164 of the driving gear 163.

The positions of the optical path switching rack 161 and the focus adjustment rack 162 prior to movement by the gear 163 are shown by the solid lines in FIG. 13. The positions following movement are indicated by the dashed lines. The first optical path 90 is shown by a "double broken" line, and the second optical path 100 is shown by the "triple broken" line.

When the driving gear 163 rotates, the focus adjustment rack 162 moves and performs focus adjustment of the first and second optical systems 91 and 101.

Simultaneously, when the large-diameter gear 165 of the driving gear 163 rotates, the optical path switching rack 161 which enmeshes therewith moves up and down. When the optical path switching rack 161 is at the position of the solid lines shown in FIG. 13, the light from the original 20 is reflected by the reflective mirror 160, and advances along the first optical path 90. When the optical path switching rack 161 rises to the position of the dashed lines in FIG. 13, the light from the original 20 is reflected by the reflective mirror 160 and the optical path switches to the second optical path 100.

In the embodiment of FIG. 13, there is only one reflective mirror 160. This arrangement reduces the number of components and simplifies the structure of the optical path switching assembly 80.

The small-diameter gear 164 and the large-diameter gear 165 rotate integrally to perform simultaneous focus adjustment and switching of the optical paths. However, the switching between the first and second optical paths 90 and 100 and focus adjustment of the first and second optical systems 91 and 101 can be performed independently by causing the two gears 164 and 165 to rotate alternatively with a clutch.

Figure 14:
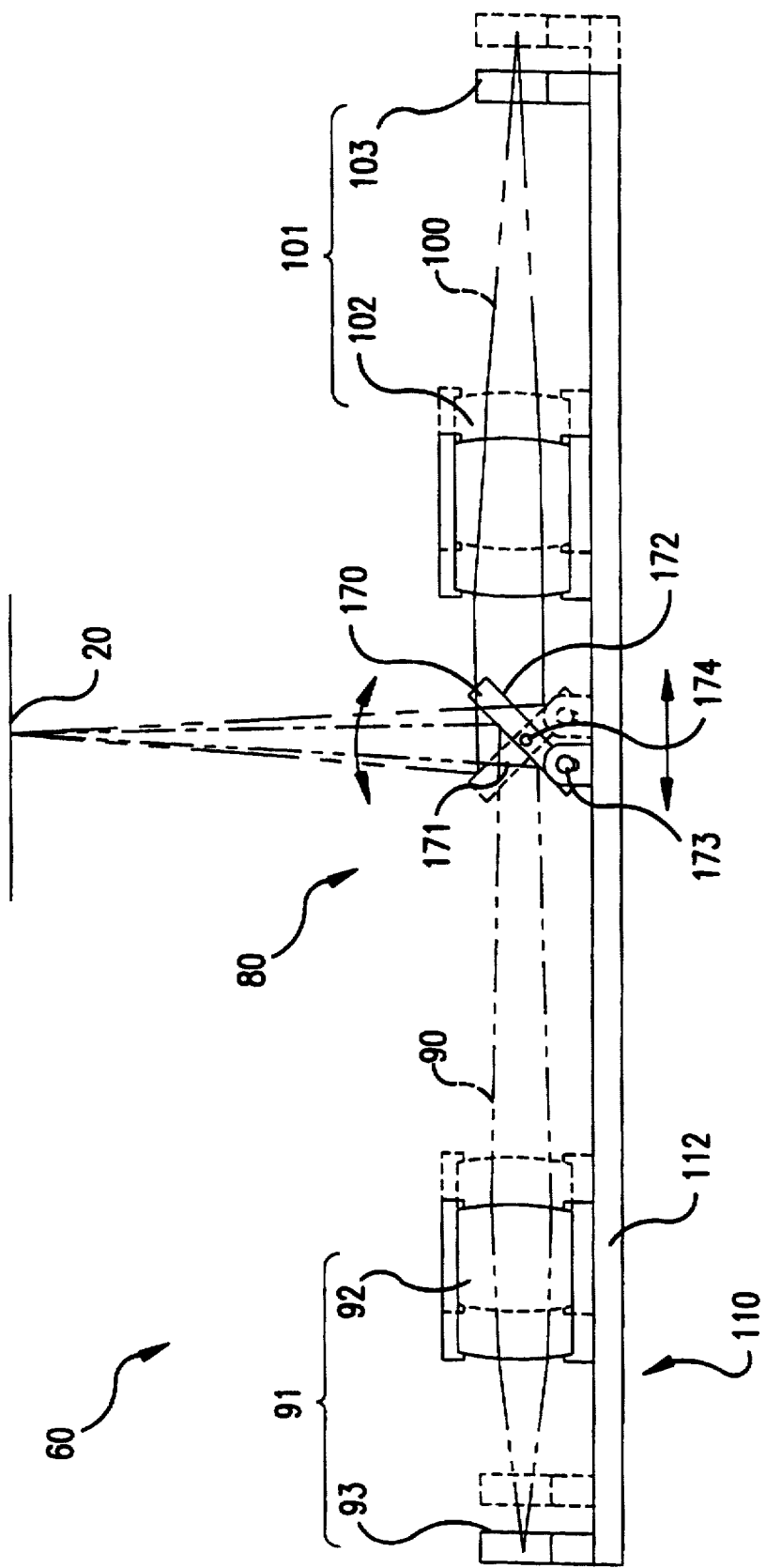
FIG. 14 is a schematic view of another embodiment of the optical system according to the present invention.
Figure 15:
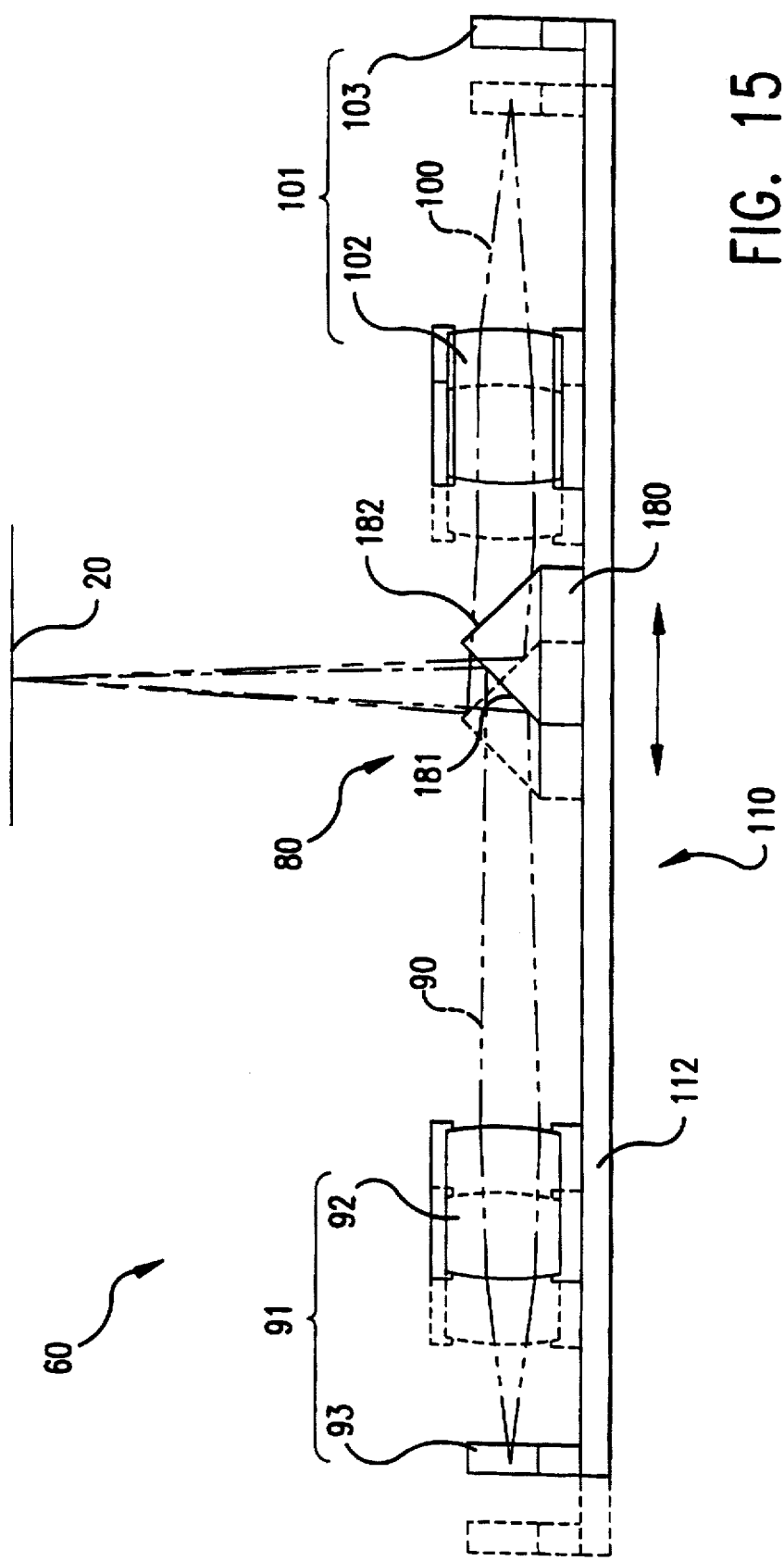
FIG. 15 is a schematic view of another embodiment of the optical system according to the present invention.

FIGS. 14 and 15 illustrate additional embodiments of the original reading system for use in the image input device according to the present invention. In FIGS. 14 and 15, the first and second optical systems 91 and 101 are aligned along the same axis in a linear arrangement.

In FIG. 14, the original reading system includes a single reflective mirror 170 having reflective surfaces on the front and back surfaces. The reflective mirror 170 performs switching of the first and second optical paths 90 and 100 by rotating about an axis of rotation 171.

This moving stage 112 slides in a direction orthogonal to the optical axis of the light from the original 20. The reflective mirror 170 has first and second reflective surfaces 171 and 172 on the front and back surfaces, as shown in FIG. 14. The reflective mirror 170 has an axis of rotation 173 on a back edge that axially supports the mirror 170 at approximately the center of the moving stage 112. The reflective mirror 170 is rotated by a support shaft 174 during the sliding of the moving stage, as indicated by the solid lines and dashed lines in FIG. 14.

Positions prior to the movement of the moving stage 112 are shown by the solid lines in FIG. 14, while positions following movement are indicated by the dashed lines. Furthermore, the first optical path 90 prior to movement is shown in the drawing by means of a "double broken" line, while the second optical path 100 following movement is shown by means of a "triple broken" line.

With this arrangement, focus adjustment of the first and second optical systems 91 and 101 is performed by sliding the moving stage 112, as shown in FIG. 14. When the moving stage 112 is at the position of the solid lines shown in FIG. 14, the light from the original 20 is reflected by the first reflective surface 171 of the reflective mirror 170 and advances along the first optical path 90. When the moving stage 112 is moved to the position of the dashed lines in FIG. 14, the reflective mirror 170 rotates about the axis of rotation 173, and the light from the original 20 is reflected by the second reflective surface 172 on the opposite side of the reflective mirror 170 and the optical path switches to the second optical path 100.

In FIG. 15, the original reading assembly includes a single reflective mirror 180 having reflective surfaces on inclined surfaces that slope to the front and back. Switching between the first and second optical paths 90 and 100 is accomplished by sliding the reflective mirror 180.

The reflective mirror 180 has the shape of an inverted "v", as shown in FIG. 15. The first and second reflective surfaces 181 and 182 are located on the inclined surfaces thereof. The bottom of the reflective mirror 180 is fixed at approximately the center of the moving stage 112 in the direction of length. The first and second inclined surfaces 181 and 182 are held so as to maintain 45° angles with the optical axis of the light from the original 20.

Positions prior to movement of the moving stage 112 are shown by the solid lines in FIG. 15, while the position following movement is indicated by the dashed lines. Furthermore, the first optical path 90 prior to movement is shown in the drawing by means of a "double broken" line, while the second optical path 100 following movement is shown by means of a "triple broken" line.

With this arrangement, it is possible to adjust the focus of the first and second optical systems 91 and 101 by sliding the moving stage 112, as shown in FIG. 15. When the moving stage 112 is at the position of the solid lines in FIG. 15, the light from the original 20 is reflected by the first reflective surface 181 of the reflective mirror 180 and advances along the first optical path 90. When the moving stage 112 is moved to the position of the dashed lines in FIG. 15, the second reflective surface 182 on the opposite side of the reflective mirror 180 is moved into the optical path of the light from the original 20. The light from the original 20 is then reflected by the second reflective surface 182 on the opposite side of the reflective mirror 180 and the optical path is switched to the second optical path 100.

Figure 16:
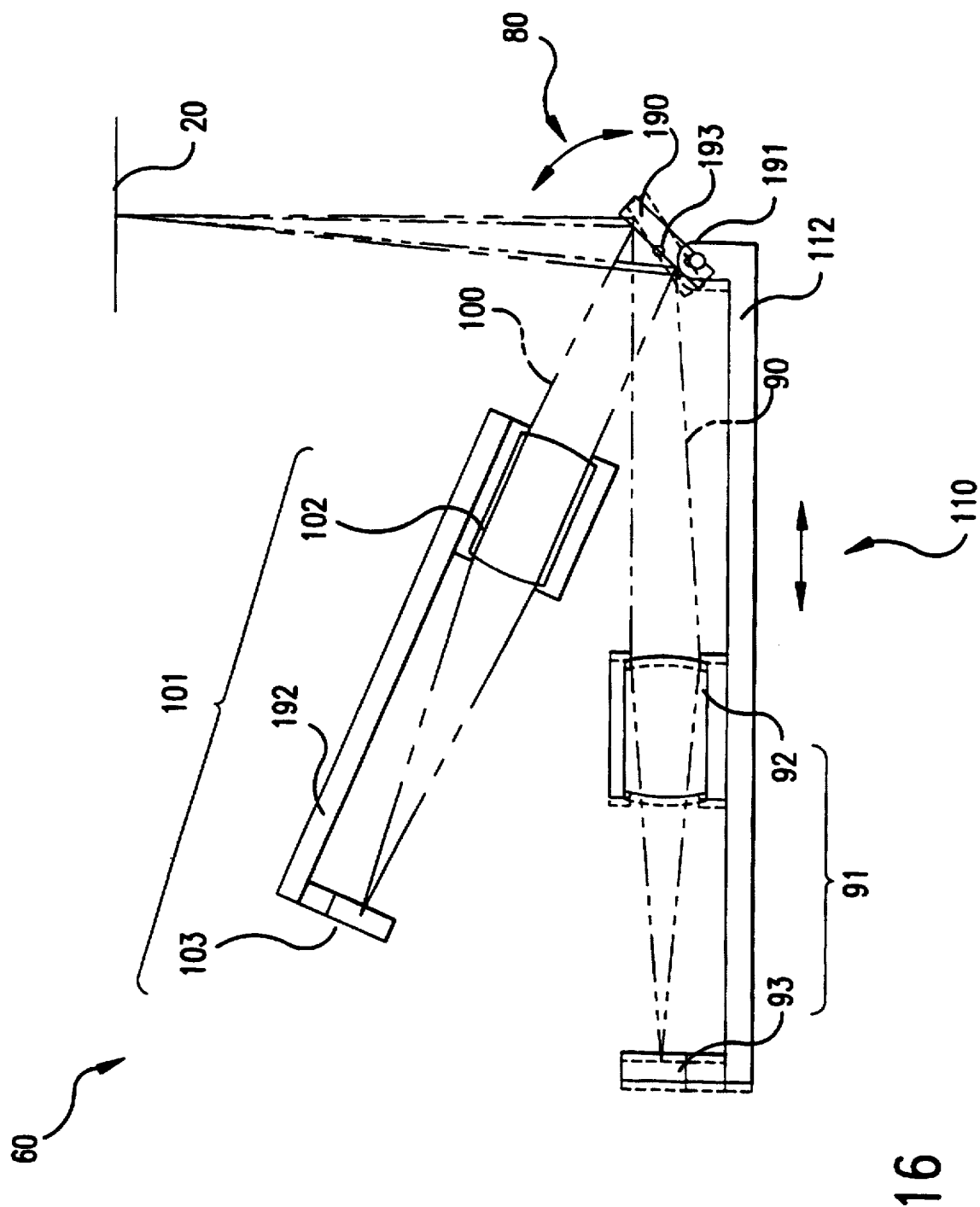
FIG. 16 is a schematic view of another embodiment of the optical system according to the present invention.
Figure 17:
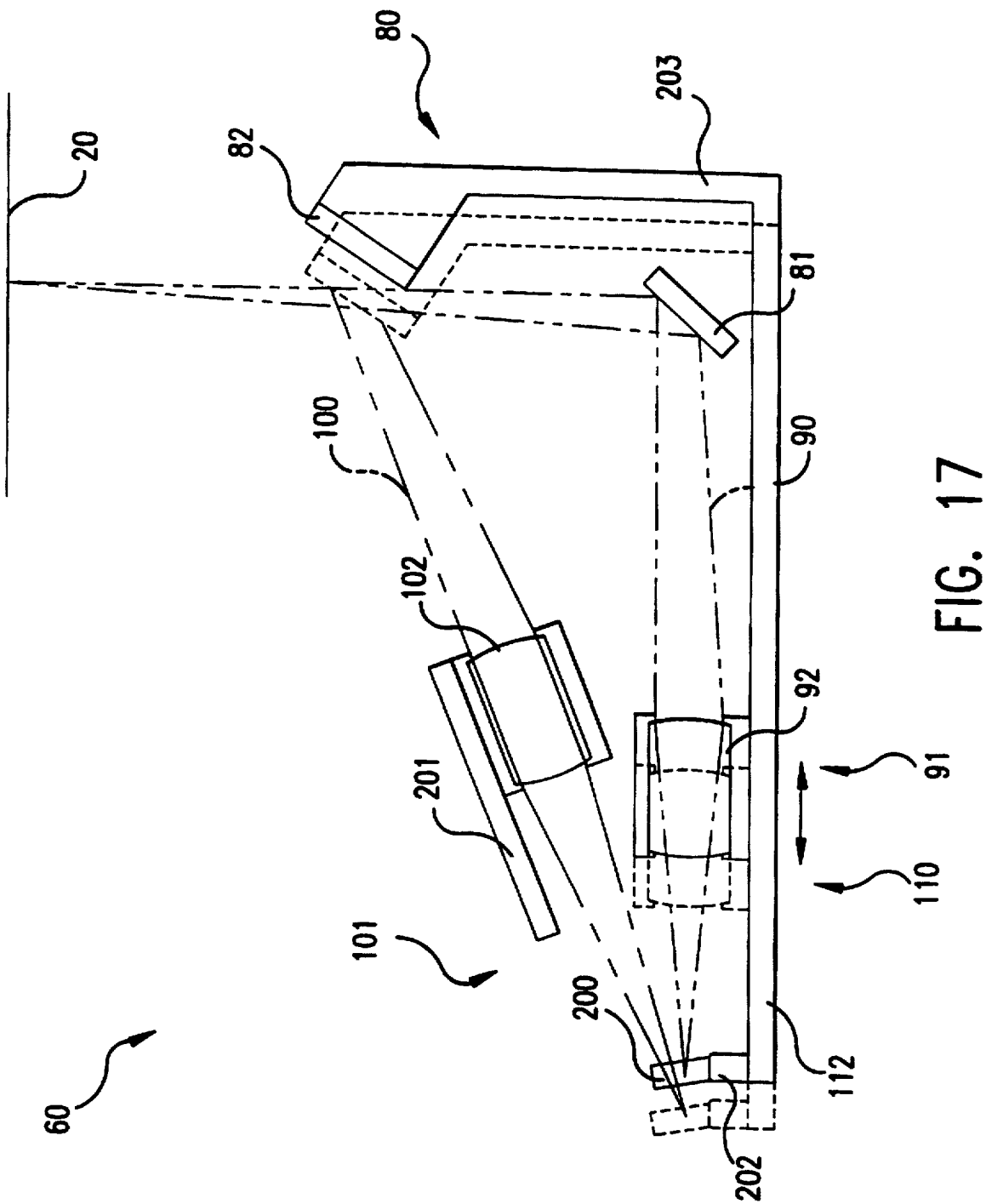
FIG. 17 is a schematic view of another embodiment of the optical system according to the present invention.
Figure 18:
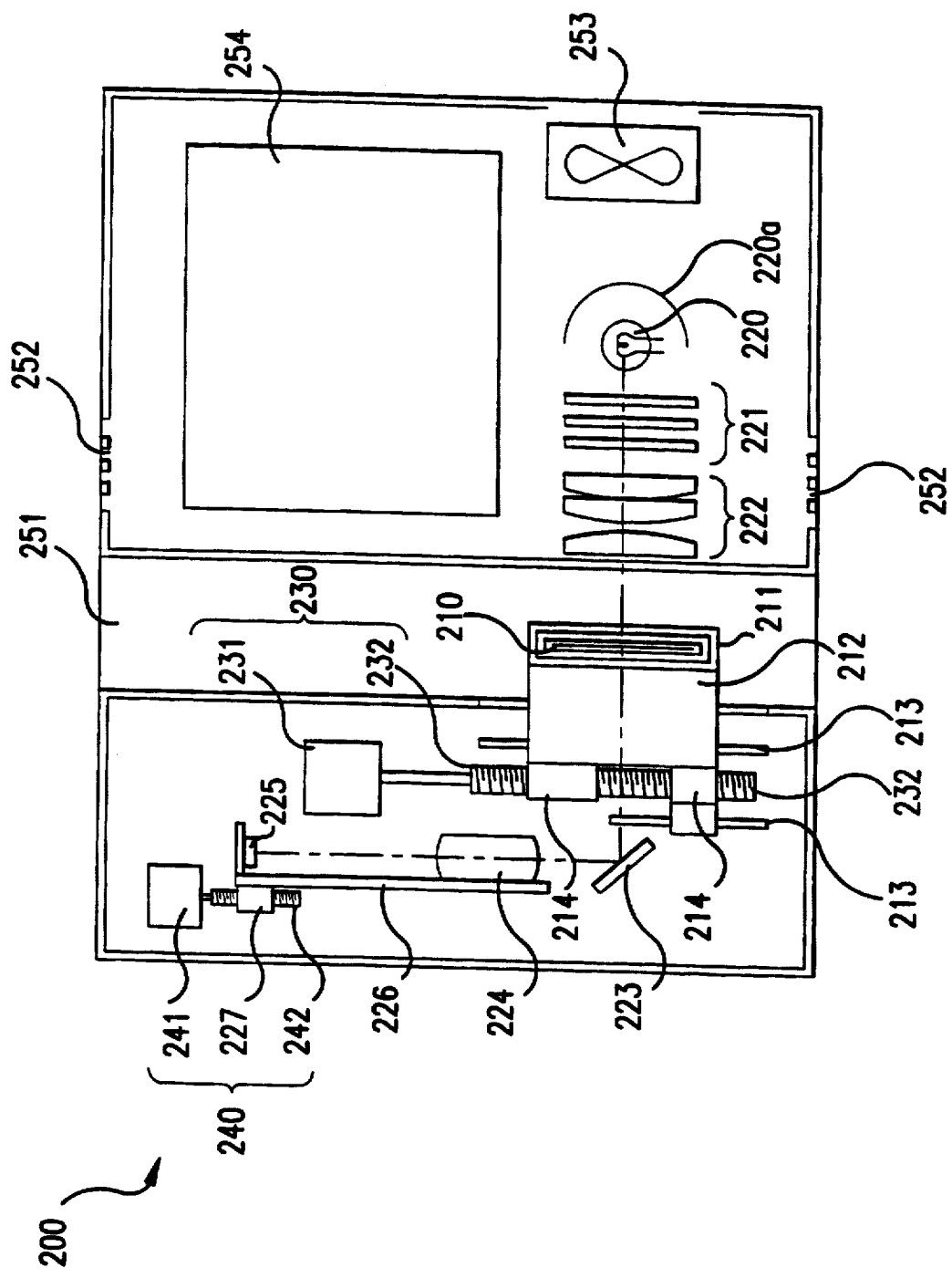
FIG. 18 is a side schematic view of a conventional image input device.
Figure 19:
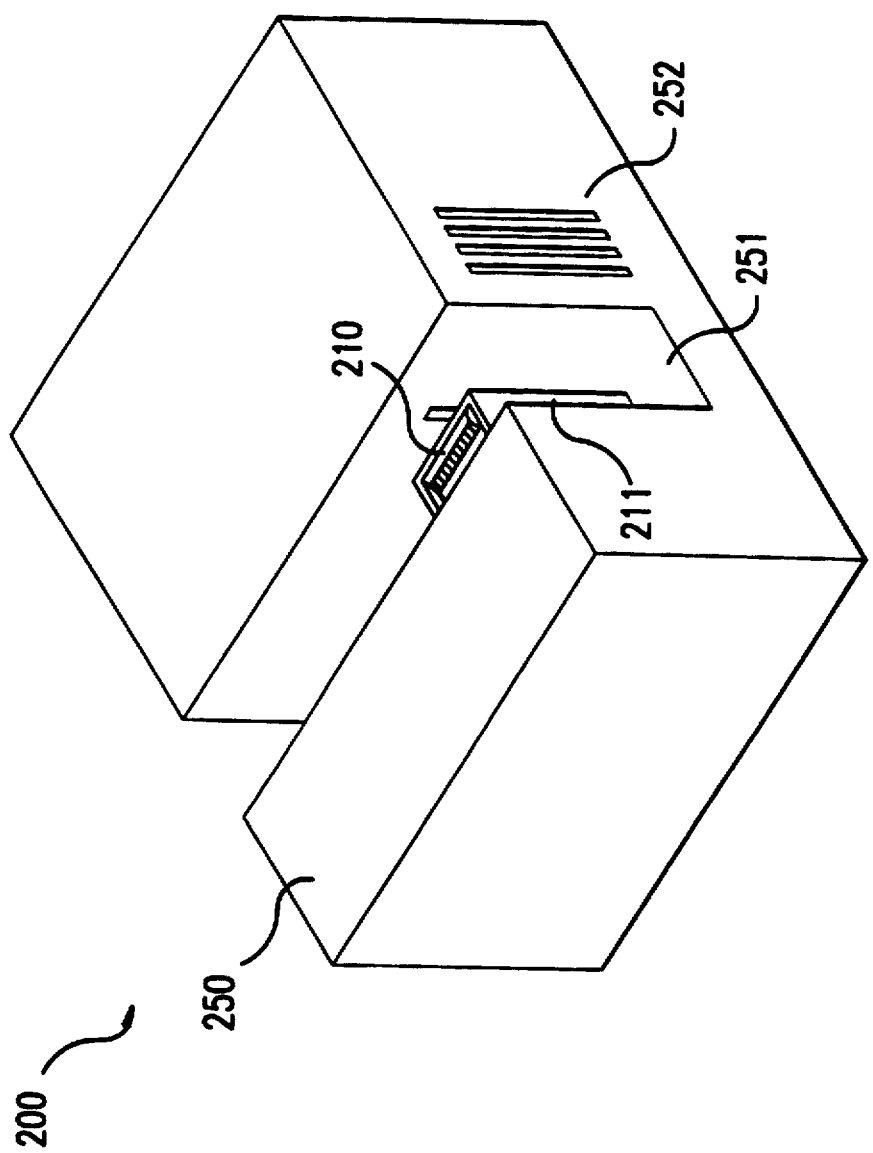
FIG. 19 is a front perspective view of the conventional image input system of FIG. 18.

FIGS. 16 and 17 illustrate additional embodiments of the original reading assembly for use in the image input device according to the present invention. The first and second optical systems 91 and 101 are oriented at differing angles with respect to the optical axis of the light from the original 20.

In FIG. 16, the optical system 60 switches between the first and second optical paths 90 and 100 with a single reflective mirror 190. The reflective mirror 190 rotates about a support shaft 193, as shown in FIG. 16. The first optical system 91 is fixed on the moving stage 112, as shown in FIG. 16. The second optical system 101 is fixed to a fixing stage 192. The fixing stage 192 is inclined at a predetermined angle with respect to the moving stage 112.

The single reflective mirror 190 is axially supported about an axis of rotation 191 provided on the back edge of the moving stage 112. Furthermore, the reflective mirror 190 is rotated by a support shaft 193 during sliding of the moving stage 112, as illustrated by the solid lines and dashed lines in FIG. 16.

The positions prior to the movement of the moving stage 112 are shown by the solid lines in FIG. 16, while positions following movement are indicated by the dashed lines. The first optical path 90 prior to movement is shown by a "double broken" line, while the second optical path 100 following movement is shown by a "triple broken" line.

With this arrangement, focus adjustment of the first optical system 91 is performed by moving the moving stage 112, as shown in FIG. 16. Focus adjustment of the second optical system 101 is accomplished by adjusting the distance between the reflective mirror 190 and the second imaging lens unit 102 of the second optical system 101 by sliding of the moving stage 112. Alternatively, focus adjustment of the second optical system 101 could be performed by moving the fixing stage 192.

When the moving stage 112 is at the position indicated by the solid lines in FIG. 16, the light from the original 20 is reflected by the reflective mirror 190 and advances along the first optical path 90. When the moving stage 112 is moved, the reflective mirror 190 rotates about the axis of rotation 191 to the position indicated by the dashed lines in FIG. 16, and the light from the original 20 is reflected by the rotated reflective mirror 190 and advances along the second optical path 100.

In FIG. 17, the optical axis of the first and second optical paths 90 and 100 intersect. A single common sensor 200 is positioned at the intersection of the two paths and is used with both the first and second optical systems 91 and 101.

First, the first imaging lens unit 92 of the first optical system 91 and the single common sensor 200 are fixed to the moving stage 112, as shown in FIG. 17. The second imaging lens unit 102 of the second optical system 101 is fixed to a fixing stage 201 that is fixed at a predetermined angle with respect to the moving stage 112. The common sensor 200 is fixed to the front edge of the moving stage 112 and is supported in an inclined orientation on a sensor support stage 202.

A mirror fixing unit 203 is located on the back edge of the moving stage 112. The mirror fixing unit 203 has a bent L shape and extends in an upward direction. A second reflective mirror 82 is attached to the top edge of the mirror fixing unit 203. The second reflective mirror 82 is fixed to the mirror fixing unit 203 such that the mirror 82 is oriented at a 45° angle with respect to the optical axis of the light from the original 20.

With this arrangement, focus adjustment of the first optical system 91 is performed by moving the moving stage 112, as shown in FIG. 17. When the moving stage 112 is in the position indicated by the solid lines in FIG. 17, the light from the original 20 is reflected by the first reflective mirror 81 and advances along the first optical path 90. The reflected light is composed into an image on the common sensor 200 by the first imaging lens unit 92 of the first optical system 91.

When the moving stage 112 moves to the position indicated by the dashed lines in FIG. 17 the second reflective mirror 82 affixed to the mirror fixing unit 203 protrudes into the optical path of the light from the original 20. The light is then reflected by the second reflective mirror 82 so that the optical path switches to the second optical path 100. The reflected light is composed into an image on the common sensor 200 by the second imaging lens unit 102 of the second optical system 101.

While this invention has been described in conjunction with specific embodiments thereof, it is evident that many alternatives, modifications and variations will be apparent to those skilled in the art. Accordingly, the preferred embodiments of the invention as set forth herein are intended to be illustrative not limiting. Various changes may be made without departing from the spirit and scope of the invention as defined by the following claims.

What is claimed is:

1. An image input device comprising:

an original holder that holds an original medium;

an illumination assembly that illuminates an image on the original medium on said original holder and causes light to be reflected from/transilluminated through the original medium;

an image composing assembly that composes an image from the reflected light from/transilluminated through the original medium illuminated by said illumination assembly comprising a first imaging assembly and a second imaging assembly;

an image reading assembly that reads images composed by said first and second imaging assemblies, said image reading assembly having at least one sensor that reads the images composed by said first and second imaging assemblies;

an optical path switching assembly placed within an optical path between the original medium and said first and second imaging assemblies that switches between a first optical path that guides the reflected light from/transilluminated through the original medium to said first imaging assembly, and a second optical path that guides the reflected light from/transilluminated through the original medium to said second imaging assembly;

a focusing assembly that focuses the image composed by said image composing assembly and read by said image reading assembly; and a driving assembly that drives each of said focusing assembly and said optical path switching assembly.

2. The image input device according to claim 1, wherein said optical path switching assembly includes a half mirror.

3. The image input device according to claim 1, wherein said optical path switching assembly includes at least one reflective mirror.

4. The image input device according to claim 3, wherein said optical path switching assembly includes a first reflective mirror that reflects light towards said first imaging assembly, and a second reflective mirror movably positioned in an optical path between said first reflective mirror and said original holder, wherein when said second reflective mirror is disposed within said optical path between said first reflective mirror and said original holder, the light is reflected toward said second imaging assembly.

5. The image input device according to claim 3, wherein said at least one reflective mirror includes a reflective mirror having a first reflective surface that reflects light towards said first imaging assembly, and a second reflective surface that reflects light toward said second imaging assembly.

6. The image input device according to claim 5, wherein said reflective mirror is movable such that said first and second reflective surfaces are alternatively positioned within the optical path of the reflecting light.

7. The image input device according to claim 3, wherein said at least one reflective mirror includes a single movable reflective mirror positioned at an angle with respect to the optical axis of reflecting light from the original, wherein said single movable reflective mirror is movable such that it is capable of changing the angle with respect to the optical axis of the reflecting light.

8. The image input device according to claim 7, wherein said first and second imaging assemblies are positioned at different angles with respect to the optical axis of the reflecting light.

9. The image input device according to claim 3, wherein said at least one reflective mirror moves parallel to an optical axis of the reflecting light.

10. The image input device according to claim 1, wherein said focusing assembly detects the focus condition of the image on said at least one sensor and executes a focusing operation by changing at least one of the relative positions of said image composing assembly and said image reading assembly with respect to the original.

11. The image input device according to claim 10, wherein said focusing assembly performs a focusing operation by changing each of the distances between the original medium and said first and second imaging assemblies while the distances between said first and second imaging assemblies and said at least one sensor are fixed.

12. The image input device according to claim 10, further comprising an optical system holder that holds said image composing assembly and said image reading assembly.

13. The image input device according to claim 12, wherein said focusing assembly performs the focusing operation by moving one of said original holder and said optical system holder.

14. The image input device according to claim 10, further comprising:

a transfer assembly that transfers the driving force of said driving assembly to said focusing assembly.

15. The image input device according to claim 14, further comprising a connection assembly that transfers the driving force of said driving assembly from said transfer assembly to said optical path switching assembly.

16. The image input device according to claim 14, wherein said transfer assembly permits movement of said focusing assembly in at least three different movement ranges, said at least three different movement ranges including a focusing movement range during which the focusing operation is performed by said focusing assembly, an optical path switching movement range during which a switching operation is performed by said optical path switching assembly, and a shipping movement range that interrupts the transfer of the driving force from said driving assembly to said focusing assembly.

17. The image input device according to claim 16, further comprising a connecting assembly that transfers the driving force transferred to the focusing assembly to said optical path switching assembly when said focusing assembly moves into the optical path switching range.

18. The image input device according to claim 16, further comprising:

a stop assembly that prevents movement of said focusing assembly in said shipping movement range.

19. The image input device according to claim 1, wherein said focusing assembly includes a moving stage such that said driving assembly moves said moving stage parallel to the optical axis of said first and second optical paths to perform a focusing operation.

20. The image input device according to claim 19, further comprising:

a transfer assembly that transfers the driving force of said driving assembly to said focusing assembly, wherein said transfer assembly is connected to said moving stage; and a force-applying assembly mounted on said moving stage that applies a force to move said moving stage towards said transfer assembly.

21. The image input device according to claim 19, wherein said moving stage has first and second opposing surfaces, said first imaging assembly and a first sensor being supported on said first surface, and said second imaging assembly and a second sensor being supported on said second surface.

22. The image input device according to claim 1, wherein said first and second imaging assemblies have different magnifications.

23. The image input device according to claim 22, wherein a range of focal depth of one of said first and second imaging assemblies includes a range of focal depth of the other of said first and second imaging assemblies.

24. The image input device according to claim 22, wherein the distances between said at least one sensor and said first and second imaging assemblies are fixed.

25. An image input device comprising:

original holding means for holding an original;

illuminating means for illuminating an image on the original;

image composing means for composing light from the illuminated original into an image;

image reading means for reading images composed by said image composing means;

optical path switching means located in an optical path between the original and said image composing means for switching the reflecting light between a first optical path and a second optical path;

focusing means for focusing the image composed by said image composing means and read by said image reading means; and driving means for driving each of said focusing means and said optical path switching means.

26. The image input device according to claim 25, wherein said optical path switching means includes reflecting means for reflecting light along one of said first and second optical paths.

27. The image input device according to claim 25, wherein said focusing means detects the focus condition of the image composed by said image composing means and executes a focusing operation by changing at least one of the relative positions of said image composing means and said image reading means with respect to said original.

28. The image input device according to claim 25, further comprising transfer means for transferring the driving force of said driving means to said focusing means.

29. The image input device according to claim 28, further comprising connecting means for transferring the driving force of said driving means from said transfer means to said optical path switching means.

30. The image input device according to claim 25, wherein said transferring means permits movement of said focusing means in at least three differing movement ranges, said at least three differing movement ranges including a focusing movement range during a focusing operation is performed, an optical path switching movement range during which a switching action is performed by said optical path switching means, and a shipping movement range that interrupts the transfer of driving means from said driving means to said focusing means.

31. The image input device according to claim 30, further comprising connecting means for transferring the driving force transferred to said focusing means to said optical path switching means when said focusing means is within the optical path switching range.

32. The image input device according to claim 30, further comprising:

stopping means for preventing movement of said focusing means in said shipping movement range.

33. The image input device according to claim 25, further comprising holder means for holding said image composing means and said image reading means, wherein said focusing means performs a focusing operation by moving one of said original holding means and said holder means.

34. A method of using an image input device for reading image information from an original medium, said method comprising the steps of:

loading the original medium into the image input device;

illuminating an image on the original using an illumination assembly;

selectively composing an image from light reflected from/transilluminated through the original medium with at least one of a first imaging assembly and a second imaging assembly;

reading an image composed by one of the first and second imaging assemblies;

switching between a first optical path that guides the reflecting light from the original medium to the first imaging assembly, and a second optical path that guides the reflecting light from the original medium to the second imaging assembly; and focusing the image composed by one of the first and second imaging assemblies.

35. The method according to claim 34, wherein said step of focusing the image includes simultaneously focusing the first and second imaging assemblies.

36. The method according to claim 34, wherein said step of switching includes positioning a reflective mirror in the optical path of the light reflecting from/transilluminating through the original medium to deflect the optical path to one of the first and second imaging assemblies.

37. The method according to claim 34, wherein said step of focusing includes detecting a focus condition of the image composed by one of the first and second imaging assemblies.

38. The method according to claim 37, wherein said step of reading an image includes reading an image with an image reading assembly.

39. The method according to claim 38, wherein said step of focusing further includes executing a focusing operation by changing at least one of the relative positions of the first and second imaging assemblies and said image reading assembly with respect to the original medium.

40. The method according to claim 38, wherein said step of focusing further includes performing a focusing operation by changing each of the distances between the original medium and the first and second imaging assemblies while the distances between the first and second imaging assemblies and the image reading assembly are fixed.

41. The method according to claim 34, wherein the image input device includes an image reading assembly that reads images composed by the first and second imaging assemblies, the image reading assembly and the first and second imaging assemblies being mounted within an optical system holder, whereby said step of focusing includes performing a focusing operation by moving one of the original holder and the optical system holder.

42. The method according to claim 34, wherein said focusing step includes performing a focusing operation using a focusing assembly.

43. The method according to claim 42, further comprising the step of applying a driving force to the focusing assembly such that the focusing assembly performs the focusing operation.

44. The method according to claim 43, further comprising the step of transferring the driving force to the optical path switching assembly to perform said switching step.

45. The method according to claim 43, wherein the image input device includes a driving assembly for applying the driving force to the focusing assembly and for disengaging the driving assembly from the focusing assembly during transporting of the image input device, said method further comprising the step of engaging the driving force with the focusing assembly prior to loading the original medium.

46. The method according to claim 34, wherein the step of loading the original medium includes loading the original medium on an original holder.

* * * * *